(12) United States Patent
Papaleo et al.

(10) Patent No.: US 11,950,221 B2
(45) Date of Patent: *Apr. 2, 2024

(54) TECHNIQUES TO SYNCHRONIZE RADIO ACCESS TECHNOLOGIES FOR CO-CHANNEL OPERATION

(71) Applicant: QUALCOMM Incorporated, San Diego, CA (US)

(72) Inventors: Marco Papaleo, Bologna (IT); Xiao Feng Wang, San Diego, CA (US); Shailesh Patil, San Diego, CA (US); Maarten Menzo Wentink, Nijmegen (NL); James Lansford, Cascade, CO (US); Jamshid Khun-Jush, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,458

(22) Filed: Jul. 7, 2022

(65) Prior Publication Data

US 2022/0408452 A1 Dec. 22, 2022

Related U.S. Application Data

(63) Continuation of application No. 16/821,442, filed on Mar. 17, 2020, now Pat. No. 11,412,524.

(Continued)

(51) Int. Cl.
*H04W 72/12* (2023.01)
*H04W 16/14* (2009.01)
(Continued)

(52) U.S. Cl.
CPC ....... *H04W 72/1215* (2013.01); *H04W 16/14* (2013.01); *H04W 72/23* (2023.01); *H04W 74/0816* (2013.01)

(58) Field of Classification Search
None
See application file for complete search history.

(56) References Cited

U.S. PATENT DOCUMENTS 10,244,536 B1 3/2019 Jiang et al.
2015/0131627 A1 5/2015 Wentink et al.
(Continued)

FOREIGN PATENT DOCUMENTS

WO WO-2015174748 A1 11/2015
WO WO-2016070114 A1 5/2016

OTHER PUBLICATIONS

International Preliminary Report on Patentability—PCT/US2020/023287, The International Bureau of WIPO—Geneva, Switzerland, dated Sep. 16, 2021.

(Continued)

*Primary Examiner* — Jenkey Van
(74) *Attorney, Agent, or Firm* — Holland & Hart LLP

(57) ABSTRACT

Methods, systems, and devices for wireless communications are described. A wireless device that uses a first radio access technology (RAT) may identify a transmission timing scheme for a shared radio frequency spectrum band, the transmission timing scheme comprising a first set of time intervals allocated for transmissions using a first RAT and a second set of time intervals allocated for transmissions using a second RAT. The wireless device may transmit, during a time interval of the first set of time intervals, a channel reservation signal indicating an end time of the time interval and indicating that the wireless device uses the first RAT. The wireless device may transmit, based at least in part on the transmitted channel reservation signal, over the shared radio frequency spectrum band during at least a portion of the time interval before the end time of the time interval.

19 Claims, 15 Drawing Sheets

Related U.S. Application Data

(60) Provisional application No. 62/820,791, filed on Mar. 19, 2019.

(51) Int. Cl.
  *H04W 72/23* (2023.01)
  *H04W 74/08* (2009.01)
  *H04W 74/0816* (2024.01)

(56) References Cited

U.S. PATENT DOCUMENTS

| | | | |
|---|---|---|---|
| 2016/0066204 A1* | 3/2016 | Khawer | H04W 72/542 455/500 |
| 2016/0095110 A1 | 3/2016 | Li et al. | |
| 2016/0128130 A1 | 5/2016 | Sadek et al. | |
| 2016/0255653 A1 | 9/2016 | Malik et al. | |
| 2016/0353482 A1 | 12/2016 | Valliappan et al. | |
| 2017/0011889 A1 | 1/2017 | Winkler | |
| 2017/0048889 A1 | 2/2017 | Kadous et al. | |
| 2017/0055290 A1 | 2/2017 | Lv et al. | |
| 2017/0111889 A1 | 4/2017 | Li et al. | |
| 2017/0134975 A1 | 5/2017 | Huang et al. | |
| 2017/0208627 A1 | 7/2017 | You et al. | |
| 2017/0295560 A1 | 10/2017 | Kim et al. | |
| 2017/0311191 A1* | 10/2017 | Khawer | H04W 24/10 |
| 2017/0347366 A1* | 11/2017 | Ling | H04W 72/1215 |
| 2017/0353865 A1 | 12/2017 | Li et al. | |
| 2018/0054762 A1 | 2/2018 | Kadous et al. | |
| 2018/0270842 A1 | 9/2018 | Zhang et al. | |
| 2020/0119784 A1* | 4/2020 | Lu | H04B 7/0456 |
| 2020/0305173 A1 | 9/2020 | Papaleo et al. | |

OTHER PUBLICATIONS

International Search Report and Written Opinion—PCT/US2020/023287—ISA/EPO—dated Jun. 9, 2020.

* cited by examiner

TECHNIQUES TO SYNCHRONIZE RADIO ACCESS TECHNOLOGIES FOR CO-CHANNEL OPERATION

CROSS REFERENCE

The present Application for Patent is a Continuation of U.S. patent application Ser. No. 16/821,442 by PAPALEO et al., entitled "TECHNIQUES TO SYNCHRONIZE RADIO ACCESS TECHNOLOGIES FOR CO-CHANNEL OPERATION" filed Mar. 17, 2020, which claims the benefit of U.S. Provisional Patent Application No. 62/820,791 by PAPALEO et al., entitled "TECHNIQUES TO SYNCHRONIZE RADIO ACCESS TECHNOLOGIES FOR CO-CHANNEL OPERATION," filed Mar. 19, 2019, assigned to the assignee hereof, and is hereby expressly incorporated by reference herein in its entirety.

BACKGROUND

The following relates generally to wireless communications, and more specifically to techniques to synchronize radio access technologies (RATs) for co-channel operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless networks may be heterogenous in nature. For example, wireless networks using different RATs may coexist or otherwise share resources within a given coverage area and/or purpose. That is, wireless networks implementing different RATs may be deployed with overlapping coverage areas and/or overlapping functions, which may create issues with respect to coexistence. Such issues may result in interference, blockage, and the like, between such wireless networks, which may disrupt or otherwise result in a loss of communication between wireless devices operating on the respective wireless networks. One non-limiting example of this may include, but is not limited to, wireless networks supporting vehicle-based safety and operational communications. For example, different RATs may be employed to support vehicle-based safety and operational communications, which may require wireless devices (e.g., wireless devices within the vehicle, roadside sensors, traffic management devices, and the like) to be able to successfully communicate in a heterogenous wireless network. Moreover, the specific protocols or procedures for each RAT utilized by a wireless network may be independently coordinated by a regulatory body, which may further exacerbate coexistence issues between overlapping wireless networks.

SUMMARY

The described techniques relate to improved methods, systems, devices, and apparatuses that support techniques to synchronize radio access technologies (RATs) for co-channel operation. Generally, the described techniques provide for techniques to synchronize, at least to some degree, wireless devices operating in heterogenous wireless networks implementing multiple RATs. Broadly, the described techniques support using a channel reservation signal to indicate that a wireless device using a first RAT (e.g., a cellular-based RAT) has occupied a shared channel (e.g., a shared radio frequency spectrum band) for a time interval that is associated with the first RAT. For example, the wireless device using the first RAT may determine or otherwise identify a transmission timing scheme that includes a first set of time intervals for transmitting using a first RAT and a second set of time intervals used for transmitting using a second RAT (e.g., a non-cellular based RAT, or a different cellular-based RAT) different from the first RAT. The wireless device using the first RAT may determine that it has a transmission to perform over the shared radio frequency spectrum band during a time interval from the first set of time intervals. Accordingly, the wireless device may determine or otherwise identify an end time for the time interval that it is communicating in and transmit a channel reservation signal (e.g., a clear-to-send (CTS), a CTS-to-Self, and the like) that carries or otherwise conveys an indication of the end time as well as an indication that the wireless device uses or otherwise operates according to the first RAT.

A wireless device using a second RAT (e.g., a non-cellular based RAT, such as a wireless local area network RAT, or a different cellular RAT) may also determine or otherwise identify the transmission timing scheme and receive the channel reservation signal from the wireless device using the first RAT. The wireless device using the second RAT may determine or otherwise identify that the channel reservation signal is transmitted using, or is otherwise associated with, the first RAT (e.g., that the channel reservation signal was transmitted by a wireless device using the first RAT). Based on the channel reservation signal being transmitted from a device using the first RAT, the device using the second RAT may identify the end time of the time interval from the first set of time intervals (e.g., the time intervals corresponding to or otherwise associated with the first RAT) and avoid or otherwise refrain from transmitting over the shared frequency spectrum band during the time interval(s) of the first set of time intervals (e.g., until at least the end time of the time interval). Accordingly, the wireless device using the first RAT may transmit the channel reservation signal over the shared channel which indicates the end time, which the wireless device using the second RAT may use to synchronize (at least to some degree) with wireless devices using the first RAT during the time intervals in the first set of time intervals and second set of time intervals. The wireless devices using the second RAT may, based at least in part on the synchronization, performing transmissions over the shared radio frequency spectrum band during time interval (s) of the second set of time intervals according to the transmission timing scheme.

A method of wireless communications at a wireless device is described. The method may include identifying a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT, transmitting, during a time interval of the first set of time intervals, a channel reservation signal indicating an end time of the time interval and indicating that the wireless device uses the first RAT, and transmitting, based on the transmitted channel reservation signal, over the shared radio frequency spectrum band during at least a portion of the time interval before the end time of the time interval.

An apparatus for wireless communications at a wireless device is described. The apparatus may include a processor, memory in electronic communication with the processor, and instructions stored in the memory. The instructions may be executable by the processor to cause the apparatus to identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT, transmit, during a time interval of the first set of time intervals, a channel reservation signal indicating an end time of the time interval and indicating that the wireless device uses the first RAT, and transmit, based on the transmitted channel reservation signal, over the shared radio frequency spectrum band during at least a portion of the time interval before the end time of the time interval.

Another apparatus for wireless communications at a wireless device is described. The apparatus may include means for identifying a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT, transmitting, during a time interval of the first set of time intervals, a channel reservation signal indicating an end time of the time interval and indicating that the wireless device uses the first RAT, and transmitting, based on the transmitted channel reservation signal, over the shared radio frequency spectrum band during at least a portion of the time interval before the end time of the time interval.

A non-transitory computer-readable medium storing code for wireless communications at a wireless device is described. The code may include instructions executable by a processor to identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT, transmit, during a time interval of the first set of time intervals, a channel reservation signal indicating an end time of the time interval and indicating that the wireless device uses the first RAT, and transmit, based on the transmitted channel reservation signal, over the shared radio frequency spectrum band during at least a portion of the time interval before the end time of the time interval.

Some examples of the method, apparatuses, and non-transitory computer-readable medium described herein may further include operations, features, means, or instructions for refraining from transmitting over the shared radio frequency spectrum band during the second set of time intervals.

Some examples of the method, apparatuses, and non-transitory computer-readable medium described herein may further include operations, features, means, or instructions for determining a time difference between the end time of the time interval and a transmission time of the channel reservation signal, and transmitting an indication of the determined time difference in the channel reservation signal to indicate the end time of the time interval.

Some examples of the method, apparatuses, and non-transitory computer-readable medium described herein may further include operations, features, means, or instructions for configuring a receiver address field of the channel reservation signal to indicate that the wireless device uses the first RAT.

Some examples of the method, apparatuses, and non-transitory computer-readable medium described herein may further include operations, features, means, or instructions for configuring a network allocation vector (NAV) of the channel reservation signal to indicate the end time of the time interval.

Some examples of the method, apparatuses, and non-transitory computer-readable medium described herein may further include operations, features, means, or instructions for identifying a set of NAVs, each NAV in the set of NAVs corresponding to a time difference between transmission of the channel reservation signal and the end time of the time interval, and selecting the NAV from the set of NAVs based on the time difference.

Some examples of the method, apparatuses, and non-transitory computer-readable medium described herein may further include operations, features, means, or instructions for identifying a first set of NAVs associated with using the first RAT and a second set of NAVs associated with using the second RAT, and selecting the NAV from the first set of NAVs based on the wireless device using the first RAT.

Some examples of the method, apparatuses, and non-transitory computer-readable medium described herein may further include operations, features, means, or instructions for configuring downlink control information (DCI) scheduling a transmission opportunity (TXOP) as the channel reservation signal to indicate the end time of the time interval.

Some examples of the method, apparatuses, and non-transitory computer-readable medium described herein may further include operations, features, means, or instructions for receiving, from a second wireless device operating according to the first RAT, a previous channel reservation signal during the time interval of the first set of time intervals, and identifying the end time of the time interval based on the previous channel reservation signal.

Some examples of the method, apparatuses, and non-transitory computer-readable medium described herein may further include operations, features, means, or instructions for receiving a configuration signal over the first RAT that indicates the transmission timing scheme, where the transmission timing scheme may be identified based on the configuration signal.

In some examples of the method, apparatuses, and non-transitory computer-readable medium described herein, the first RAT includes a cellular RAT and the second RAT includes an Institute of Electrical and Electronics Engineers (IEEE) 802.11 based RAT.

In some examples of the method, apparatuses, and non-transitory computer-readable medium described herein, the channel reservation signal includes a clear-to-send (CTS) signal, or a CTS-to-self signal, or a DCI signal, or a combination thereof.

In some examples of the method, apparatuses, and non-transitory computer-readable medium described herein, a first duration of each time interval in the first set of time intervals may be different from a second duration of each time interval in the second set of time intervals.

A method of wireless communications at a wireless device is described. The method may include identifying a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT, receiving, during a time interval of the first set of time intervals, a channel reservation signal over the shared radio frequency spectrum band, identifying that the received channel reservation signal is associated with the first RAT, determining an end time of the time interval based on the identification, and refraining from transmitting over the shared radio frequency spectrum band until at least the end time of the time interval.

An apparatus for wireless communications at a wireless device is described. The apparatus may include a processor, memory in electronic communication with the processor, and instructions stored in the memory. The instructions may be executable by the processor to cause the apparatus to identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT, receive, during a time interval of the first set of time intervals, a channel reservation signal over the shared radio frequency spectrum band, identify that the received channel reservation signal is associated with the first RAT, determine an end time of the time interval based on the identification, and refrain from transmitting over the shared radio frequency spectrum band until at least the end time of the time interval.

Another apparatus for wireless communications at a wireless device is described. The apparatus may include means for identifying a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT, receiving, during a time interval of the first set of time intervals, a channel reservation signal over the shared radio frequency spectrum band, identifying that the received channel reservation signal is associated with the first RAT, determining an end time of the time interval based on the identification, and refraining from transmitting over the shared radio frequency spectrum band until at least the end time of the time interval.

A non-transitory computer-readable medium storing code for wireless communications at a wireless device is described. The code may include instructions executable by a processor to identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT, receive, during a time interval of the first set of time intervals, a channel reservation signal over the shared radio frequency spectrum band, identify that the received channel reservation signal is associated with the first RAT, determine an end time of the time interval based on the identification, and refrain from transmitting over the shared radio frequency spectrum band until at least the end time of the time interval.

Some examples of the method, apparatuses, and non-transitory computer-readable medium described herein may further include operations, features, means, or instructions for monitoring, during a second time interval of the first set of time intervals allocated for transmission using the first RAT, the shared radio frequency spectrum band for channel reservation signals associated with the first RAT, and transmitting over the shared radio frequency spectrum band during the second time interval based on identifying, based on the monitoring, an absence of channel reservation signals received by the wireless device during the second time interval.

Some examples of the method, apparatuses, and non-transitory computer-readable medium described herein may further include operations, features, means, or instructions for transmitting over the shared radio frequency spectrum band during the second set of time intervals.

Some examples of the method, apparatuses, and non-transitory computer-readable medium described herein may further include operations, features, means, or instructions for decoding a receiver address field of the channel reservation signal to identify that the channel reservation signal may be configured using the first RAT.

Some examples of the method, apparatuses, and non-transitory computer-readable medium described herein may further include operations, features, means, or instructions for decoding a NAV of the channel reservation signal to identify the end time of the time interval of the first set of time intervals.

Some examples of the method, apparatuses, and non-transitory computer-readable medium described herein may further include operations, features, means, or instructions for identifying a set of NAVs, each NAV in the set of NAVs corresponding to a time difference between transmission of the channel reservation signal and the end time of the time interval, and identifying the end time based on the decoded NAV from the set of NAVs.

Some examples of the method, apparatuses, and non-transitory computer-readable medium described herein may further include operations, features, means, or instructions for identifying a first set of NAVs associated with using the first RAT and a second set of NAVs associated with using the second RAT, and identifying that the channel reservation signal may be configured using the first RAT based on the decoded NAV being from the first set of NAVs.

Some examples of the method, apparatuses, and non-transitory computer-readable medium described herein may further include operations, features, means, or instructions for decoding a DCI scheduling a TXOP as the channel reservation signal to identify the end time of the time interval.

Some examples of the method, apparatuses, and non-transitory computer-readable medium described herein may further include operations, features, means, or instructions for receiving a configuration signal over the second RAT that indicates the transmission timing scheme, where the transmission timing scheme may be identified based on the configuration signal.

In some examples of the method, apparatuses, and non-transitory computer-readable medium described herein, the first RAT includes a cellular RAT and the second RAT includes an IEEE 802.11 based RAT.

In some examples of the method, apparatuses, and non-transitory computer-readable medium described herein, the channel reservation signal includes a CTS signal, or a CTS-to-self signal, or a DCI signal, or a combination thereof.

In some examples of the method, apparatuses, and non-transitory computer-readable medium described herein, a first duration of each time interval in the first set of time intervals may be different from a second duration of each time interval in the second set of time intervals.

In some examples of the method, apparatuses, and non-transitory computer-readable medium described herein, the channel reservation signal may be transmitted in a preamble, header, and/or field that is compatible with the IEEE and/or the IEEE 802.11 family of standards. In some additional or alternative cases, the channel reservation signal may be transmitted in a preamble, header, and/or field that is compatible with one or more releases and/or versions of the 3rd Generation Partnership Project (3GPP) family of standards.

DETAILED DESCRIPTION

Figure 1:
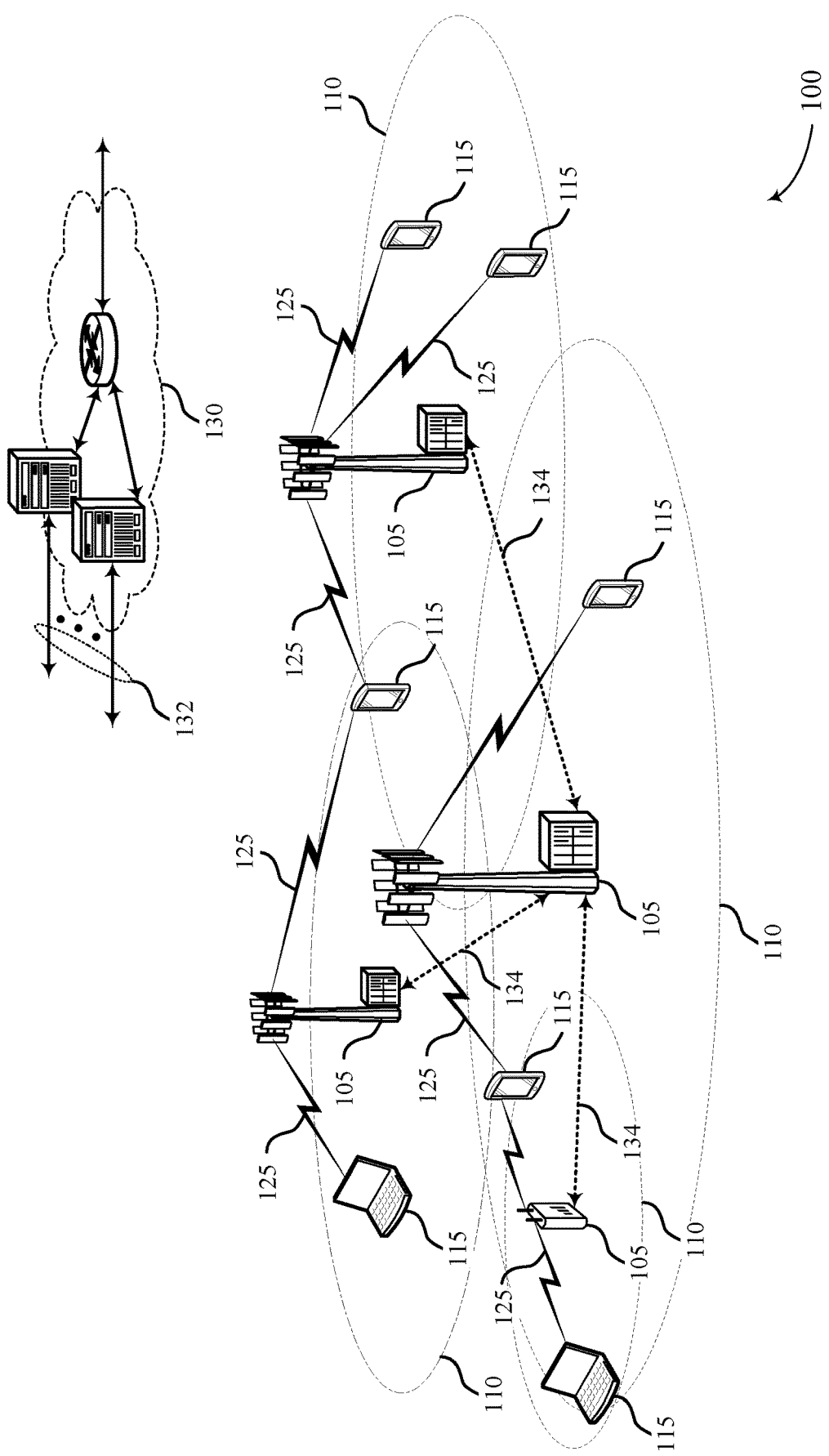
FIG. 1 illustrates an example of a system for wireless communications that supports techniques to synchronize radio access technologies (RATs) for co-channel operation in accordance with aspects of the present disclosure.

Wireless communications systems may be heterogenous. For example, wireless networks may utilize a different radio access technologies (RATs). Such distinct wireless networks may be deployed in a manner where there is at least some overlap, e.g., in terms of coverage area, function, and the like. One non-limiting example may include, but is not limited to, wireless networks that support vehicle operations, e.g., traffic safety and management systems. For example, cellular based RATs and non-cellular based RATs may each be deployed to support vehicle safety and operation wireless communications. The wireless devices in the context of a vehicle safety and operational wireless communications may include vehicle-based wireless devices (e.g., vehicle-to-everything (V2X)), roadside sensors, traffic management systems (e.g., traffic lights, road barriers, warning systems, and the like), and so forth. However, the RATs utilized by different wireless networks may interfere with or otherwise not support communications and/or coexistence between such heterogenous wireless devices. For example, wireless devices using a first RAT (e.g., a cellular-based RAT) may interfere with, or otherwise block wireless communications by wireless devices using a second RAT (e.g., a different cellular-based RAT, or a non-cellular based RAT, such as a RAT implementing one or more aspects of the Institute of Electrical and Electronic Engineers (IEEE) 802.11 family of standards, or amendments thereto, such as IEEE 802.11p), or vice versa. Such heterogenous wireless network deployments may be even more problematic when wireless devices using different RATs share a channel or radio frequency spectrum band. Accordingly, aspects of the described techniques provide methods and/or techniques to synchronize, at least to some degree, wireless devices using different RATs to improve wireless communications in a heterogenous wireless network.

In some aspects, this may include a wireless device that uses a first RAT transmitting or otherwise conveying a channel reservation signal over a shared radio frequency spectrum band that carries or otherwise conveys an indication that the channel reservation signal is from a wireless device using the first RAT and/or an indication of an end time for a time interval in which the transmission occurs. For example, wireless devices may be deployed in a heterogenous wireless network where different wireless devices use or otherwise implement different RATs. A first wireless device may use a first RAT (e.g., a cellular-based RAT), where a second wireless device may use a second RAT (e.g., an 802.11 RAT implementing aspects of an IEEE 802.11 standard or amendment, and the like) different than the first RAT. The first and/or second wireless devices may determine or otherwise identify a transmission timing scheme for the shared radio frequency spectrum band. In some aspects, the transmission timing scheme may include a first set of time intervals that are associated with, or otherwise allocated to, transmissions using the first RAT and a second set of time intervals that are associated with, or otherwise allocated to, transmissions using the second RAT. The time intervals of the first set of time intervals may be of equal length, or different lengths, as the time intervals of the second set of time intervals. The time intervals of the first (and/or second) set of time intervals may also vary in length according to a configuration or pattern. The first wireless device may determine that it has information to transmit over the shared radio frequency spectrum band. Accordingly, the first wireless device may identify the first set of time intervals and the second set of time intervals of the transmission timing scheme, and use this information to determine or otherwise identify an end time for a time interval in the first set of time intervals. The first wireless device may transmit a channel reservation signal during the time interval of the first set of time intervals. The channel reservation signal may carry or otherwise convey an indication of the end time of the time interval and/or carry or convey an indication that the first wireless device uses or is otherwise associated with the first RAT. The first wireless device may transmit over the shared radio frequency spectrum band during some or all of the time interval that occurs before the end time of the time interval.

The second wireless device may monitor the shared radio frequency spectrum band and receive the channel reservation signal from the first wireless device. The second wireless device may determine or otherwise identify that the channel reservation signal is associated with the first RAT (e.g., that the first wireless device uses the first RAT), and therefore identify the end time of the time interval. The second wireless device may refrain from transmitting on the shared radio frequency spectrum band during the time interval (e.g., until at least the end time) and, instead, transmit over the shared radio frequency spectrum band during a subsequent time interval of the second set of time intervals. Conversely, the first wireless device may transmit during time interval(s) of the first set of time intervals, but refrain from transmitting during time interval(s) of the second set of time intervals.

Aspects of the disclosure are further illustrated by and described with reference to apparatus diagrams, system diagrams, and flowcharts that relate to techniques to synchronize RATs for co-channel operation.

FIG. 1 illustrates an example of a wireless communications system 100 that supports techniques to synchronize RATs for co-channel operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different RATs (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 (e.g., a wireless device that uses a first RAT) may identify a transmission timing scheme for a shared radio frequency spectrum band, the transmission timing scheme comprising a first set of time intervals allocated for transmissions using a first radio access technology and a second set of time intervals allocated for transmissions using a second radio access technology, the wireless device operating according to the first radio access technology. The UE 115 may transmit, during a time interval of the first set of time intervals, a channel reservation signal indicating an end time of the time interval and indicating that the wireless device uses the first radio access technology. The UE 115 may transmit, based at least in part on the transmitted channel reservation signal, over the shared radio frequency spectrum band during at least a portion of the time interval before the end time of the time interval.

In some aspects, a UE 115 (e.g., a wireless device that uses a second RAT) may identify a transmission timing scheme for a shared radio frequency spectrum band, the transmission timing scheme comprising a first set of time intervals allocated for transmissions using a first radio access technology and a second set of time intervals allocated for transmissions using the second radio access technology, the wireless device operating according to the second radio access technology. The UE 115 may receive, during a time interval of the first set of time intervals, a channel reservation signal over the shared radio frequency spectrum band. The UE 115 may identify that the received channel reservation signal is associated with the first radio access technology. The UE 115 may determine an end time of the time interval based at least in part on the identification. The UE 115 may refrain from transmitting over the shared radio frequency spectrum band until at least the end time of the time interval.

Figure 2:
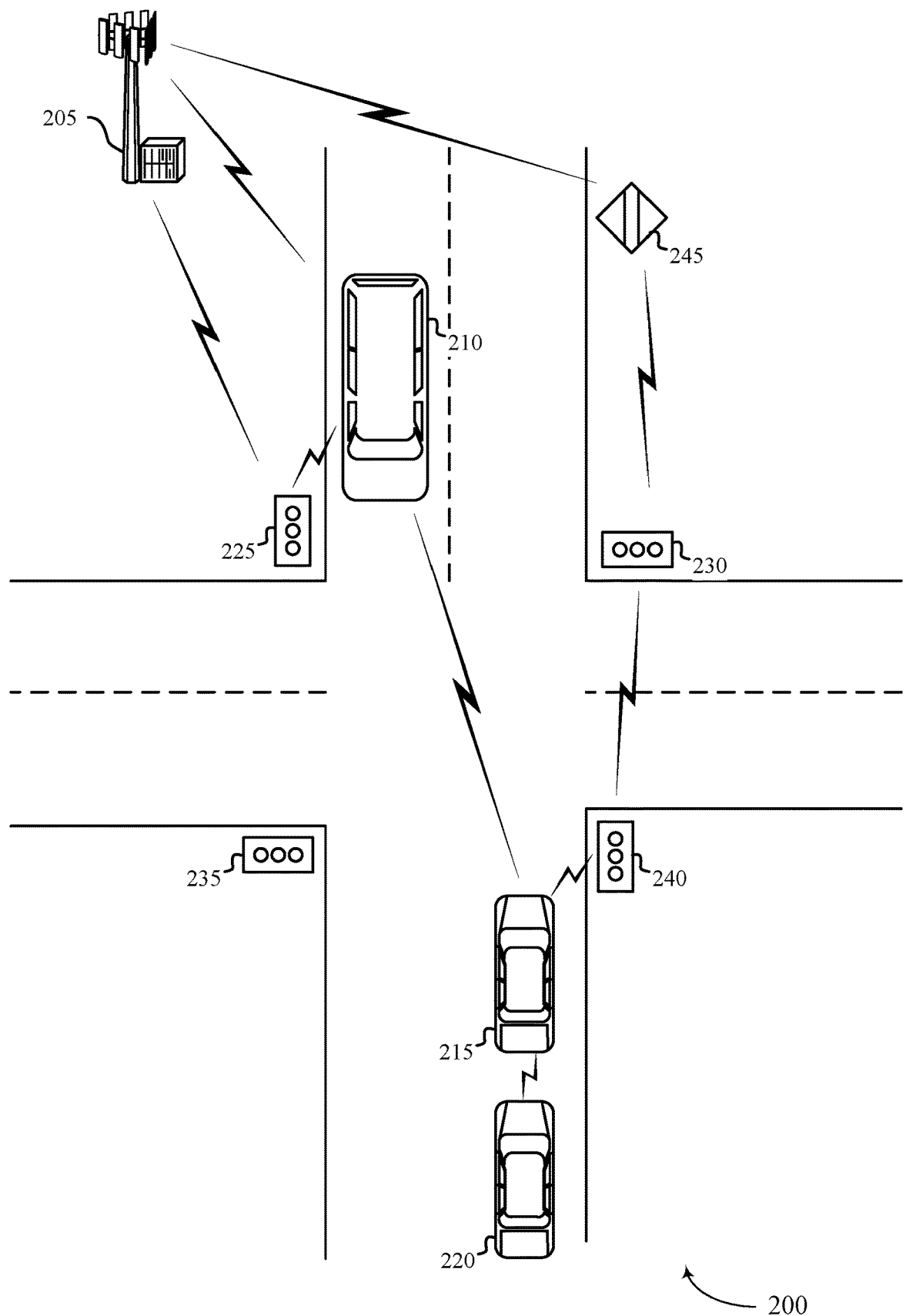
FIG. 2 illustrates an example of a wireless communications system that supports techniques to synchronize RATs for co-channel operation in accordance with aspects of the present disclosure.

FIG. 2 illustrates an example of a wireless communications system 200 that supports techniques to synchronize RATs for co-channel operation in accordance with aspects of the present disclosure. In some examples, wireless communications system 200 may implement aspects of wireless communications system 100. Aspects of wireless communications system 200 may be implemented by a base station 205, a vehicle 210, a vehicle 215, a vehicle 220, a traffic light 225, a traffic light 230, a traffic light 235, a traffic light 240, and/or a roadside sensor 245.

In some aspects, wireless communications system 200 may be a heterogenous network utilizing two or more RATs. Within the context of wireless communications system 200, base station 205 may be associated with the first rat, which may be an example of a cellular based RAT, e.g., such as an LTE RAT, LTE-A RAT, an NR RAT, a mmW RAT, a 5G RAT, and the like. Within the context of a wireless communications system 200, any of the vehicles 210-220, traffic lights 225-240, and/or roadside sensor 245 may be examples of a wireless device, where each wireless device is associated with a corresponding RAT. In some examples, any mix of the wireless devices of wireless communications system 200 as being associated with the first RAT or a second RAT may be implemented. As one non-limiting example, base station 205, vehicles 210-220, and roadside sensor 245 may be associated with the first RAT (e.g., a cellular RAT), with traffic lights 225-240 being associated with a second RAT (e.g., any non-cellular based rat, such as a Wi-Fi RAT or any RAT implementing aspects of one or more 802.11 protocols). In another non-limiting example, base station 205, vehicles 210 and 215, traffic light 225, and roadside sensor 245 may be associated with the first rat, with the vehicle 220 and traffic lights 230-240 being associated with the second RAT. As discussed, any other configuration of the heterogenous network forming the wireless communications system 200 may be utilized in accordance with aspects of the described techniques.

In one example, the first RAT may be associated with vehicle safety and operational management, such as an LTE based vehicle-to-everything (V2X) RAT. In one example, the second RAT may be associated with an intelligent transport system (ITS) RAT, such as an ITS-G5 RAT implementing aspects of the Institute of Electrical and Electronic Engineers (IEEE) 802.11p family of standards. However, the second RAT is not limited to an ITS-5G RAT, but may instead be any non-cellular based RAT.

In some examples, wireless communications system 200 implements an example where multiple RATs are deployed in an overlapping manner. For example, wireless communications system 200 may utilize aspects of an LTE-V2X RAT (e.g., the first RAT) and an ITS-G5 RAT (e.g., the second RAT), with both RATs being utilized for vehicle-based safety and operational management communications. Accordingly, each of the first RAT and the second RAT may overlap in terms of coverage area and/or purpose, which may result in each RAT sharing resources (e.g., time and/or frequency resources). Accordingly, this may result in blockage and/or interference between wireless devices using different RATs, which may disrupt or stop communications over wireless communications system 200.

In one example, this may include wireless devices of wireless communications system 200 operating over a shared radio frequency spectrum band, where some wireless devices utilize the first RAT and the other wireless devices utilize the second RAT. One approach to support this scenario may include equal time-sharing between the first and second RATs. However, this approach is wasteful when wireless devices using one RAT do not fully utilize their share of the time resources. Accordingly, sharing the radio frequency spectrum band in the time domain where each RAT is assigned an equal share of time is an inefficient way to support coexistence on the shared radio frequency spectrum band by the wireless devices. Moreover, equally allocating time resources between the different RATs may require synchronization between the two RATs. Again, some scenarios may include different RATs being unable to obtain such synchronization on a systemwide basis. Accordingly, aspects of the described techniques may utilize a channel reservation signal that provides ad hoc synchronization between at least some of the wireless devices using different RATs in wireless communications system 200.

Generally, such techniques are described with reference to a first wireless device that uses a first RAT (e.g., a cellular based RAT) and a second wireless device uses a second RAT (e.g., any non-cellular based RAT). As discussed above, references to a wireless device may include any of the components of wireless communications system 200. For example, base station 205 may be associated with the first RAT and perform wireless communications with traffic light 225, vehicle 210, and roadside sensor 245, with the remaining devices utilizing the second RAT. Any other configuration of wireless communications system 200 may be used in implementing aspects of the described techniques.

In some examples, the described techniques may utilize a virtual sensing mechanism and modify specific fields in the channel reservation signal to identify that the channel reservation signal is for a first RAT transmission (e.g., an LTE-V2X transmission). In some aspects, this may include a transmission timing scheme being developed and implemented by each component of wireless communications system 200. For example, the transmission timing scheme may include a first set of time intervals (e.g., a first set of $T_1$ intervals) being allocated to or otherwise associated with the first RAT, with a second set of time intervals (e.g., a second set of $T_1$ intervals) being allocated to or otherwise associated with the second RAT. In one example, each time interval in the first set of time intervals and the second set of time intervals may have the same duration. In one example, the time intervals in the first set of time intervals may have a duration that is different from the duration of the time intervals in the second set of time intervals. In one example, the durations within the first and/or second set of time intervals may vary (e.g., may be semi-statically and/or dynamically modified) based on traffic conditions, channel congestion, and the like. In one example, each component of wireless communications system 200 may be pre-configured with the information (e.g., duration) for the time intervals in the first and second set of time intervals. In one example, each component of wireless communications system 200 may be configured with such information using a configuration signal, e.g., such as an RRC signal, a MAC CE, and the like.

Accordingly, the first wireless device that uses the first RAT and a second wireless device that uses the second RAT may each determine or otherwise identify the transmission timing scheme for the shared radio frequency spectrum band. That is, a first wireless device that uses the first RAT may identify the transmission timing scheme for the shared radio frequency spectrum band while a second wireless device that uses the second RAT may identify the transmission timing scheme for the shared radio frequency spectrum band. Based on this information, each wireless device may know the duration of the time intervals in the first and second sets of time intervals.

In one example, the time interval may be a multiple of a transmission time interval (TTI) durations, such as multiples of 1 ms. In this example, there may be a finite set of durations used for transmissions using the first RAT (e.g., for LTE-V2X transmissions). For example, if the duration of the time intervals in the first and/or second set of time intervals is a multiple (e.g., if $T_1 = X$ ms), then only X possible durations for the time intervals may be necessary. Accordingly, this information can be precomputed and stored in a lookup table, which may simplify aspects of the described techniques.

Based on the identified transmission timing scheme, the first wireless device may transmit a channel reservation signal during a time interval of the first set of time intervals. In some aspects, the channel reservation signal may carry or convey an indication of an end time of the time interval and/or that the first wireless device uses the first RAT. In some aspects, this may include the first wireless device determining the time difference between the end time of the time interval and a transmission time of the channel reservation signal. In some aspects, this may include the first wireless device receiving a previous channel reservation signal from another wireless device using the first RAT, with the previous channel reservation signal conveying an indication of the end time. Accordingly, the first wireless device may determine when the channel reservation signal is being transmitted within a time interval from the first set of time intervals, and the time difference between the transmission of the channel reservation signal and the end time of that time interval. The first wireless device may configure the channel reservation signal to carry or convey an indication of the end time of the time interval. The indication of the end time may be an absolute indication (e.g., indicate the time corresponding to the end time) and/or a relative indication (e.g., indicate the time difference between transmission of the channel reservation signal and the end time).

In some aspects, the first wireless device may also configure the channel reservation signal to carry or convey an indication that the first wireless device uses the first RAT and/or that the channel reservation signal was transmitted using the first RAT. For example, the channel reservation signal may include one or more fields (e.g., a receiver address field) set to a value associated with the first RAT to convey the indication.

Various examples of the channel reservation signal may be used in accordance with aspects of the described techniques. One example may include a CTS signal and/or a CTS-to-Self signal carrying or conveying the indication of the end time and/or that the first wireless device uses the first RAT. In another example, a DCI scheduling a TxOP may be used as a channel reservation signal that carries or conveys the indication of the end time of the time interval and/or that the first wireless device uses the first RAT.

In some aspects, transmitting the channel reservation signal may provide at least some degree of synchronization between the wireless devices of wireless communications system 200, e.g., ad hoc synchronization between at least a portion of the wireless devices of wireless communications system 200. For example, the channel reservation signal may reserve the shared radio frequency spectrum band for the time interval of the first set of time intervals for the first wireless device (and any other wireless device using the first RAT) to perform transmissions over the shared radio frequency spectrum band. The channel reservation signal indicating the end time and that the first wireless device uses the first RAT may inform wireless devices using the second RAT of where the time interval of the first set of time intervals ends and that the time interval is used by wireless devices using the first RAT.

For example, wireless devices of wireless communications system 200 using the second RAT (e.g., second wireless devices) may receive the channel reservation signal and determine or otherwise identify that the channel reservation signal was sent from the first wireless device using the first RAT. For example, the second wireless device may decode or otherwise recover the indication from the channel reservation signal that the first wireless device uses the first RAT. Based on the determination that the channel reservation signal was sent from a wireless device using the first RAT, the second wireless device may determine or otherwise identify the end time of the time interval of the first set of time intervals. For example, the second wireless device may decode or otherwise recover the indication of the end time from one or more fields within the channel reservation signal. Based on determining that the channel reservation signal was transmitted by a wireless device using the first RAT and the identification of the end time of the time interval, a second wireless device may refrain from transmitting on the shared radio frequency spectrum band during the time interval (e.g., until at least the end time of the time interval).

In some aspects, the first wireless device may transmit over the shared radio frequency spectrum band during at least some of the time interval occurring before the end time. The second wireless device may transmit over the shared radio frequency spectrum band during a time interval of the second set of time intervals that are allocated to wireless devices using the second RAT. The first wireless device may, based at least in part on the transmission timing scheme, refrain from transmitting over the shared radio frequency spectrum band during the time interval of the second set of time intervals, but may transmit a second channel reservation signal during a subsequent time interval of the first set of time intervals (e.g., after an end time of the time interval of the second set of time intervals). Accordingly, the wireless devices of wireless communications system 200 utilizing different RATs may obtain at least some degree of synchronization to support coexistence for sharing of a radio frequency spectrum band by the distinct RATs, where the synchronization may be determined in an ad hoc manner based on the channel reservation signal(s).

Figure 3:
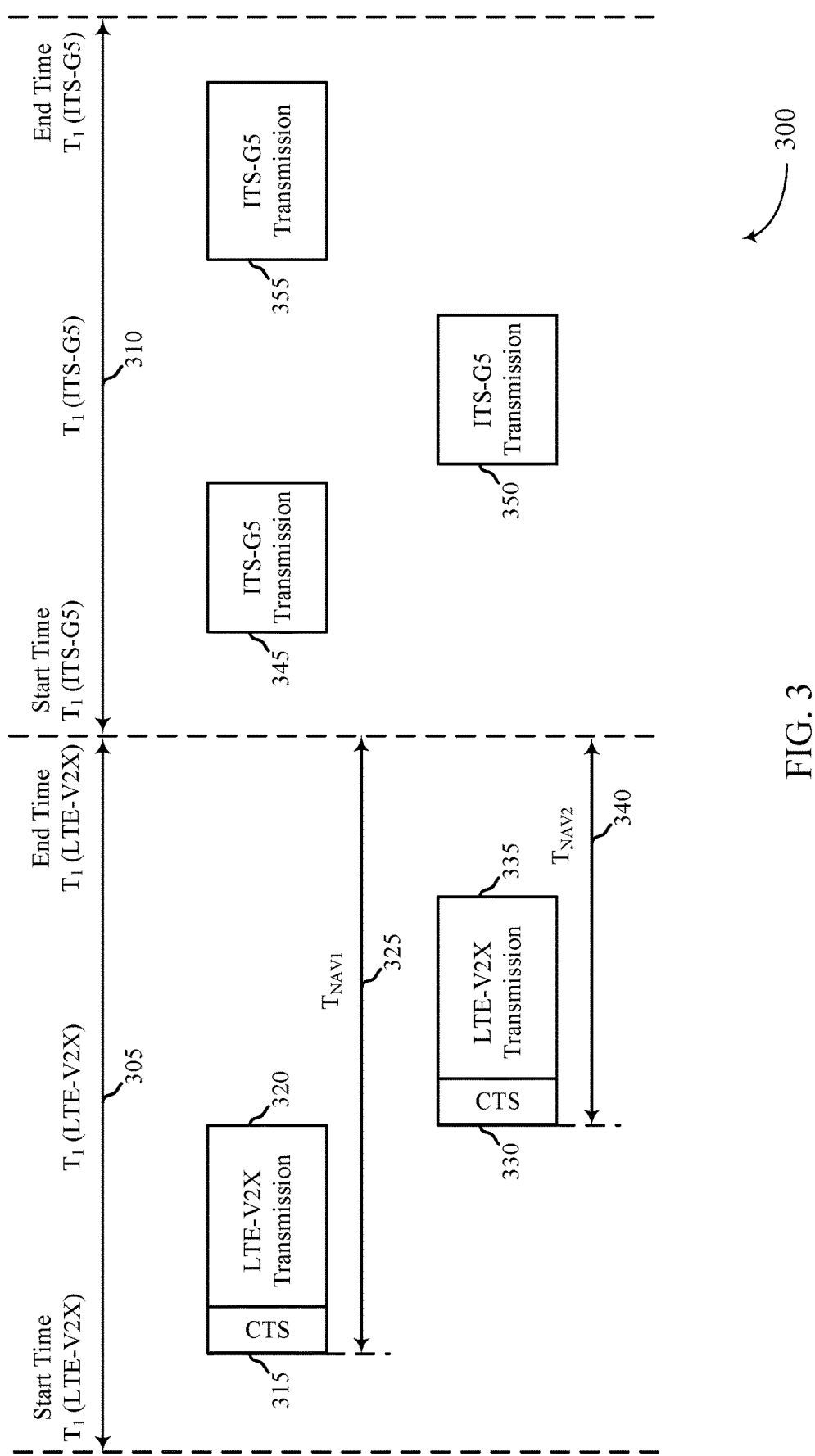
FIG. 3 illustrates an example of a transmission timing scheme that supports techniques to synchronize RATs for co-channel operation in accordance with aspects of the present disclosure.

FIG. 3 illustrates an example of a transmission timing scheme 300 that supports techniques to synchronize RATs for co-channel operation in accordance with aspects of the present disclosure. In some examples, transmission timing scheme 300 may implement aspects of wireless communications systems 100 and 200. Aspects of the transmission timing scheme 300 may be implemented by a first wireless device using a first RAT and a second wireless device using a second RAT that is different from the first RAT.

As discussed, the first and/or second wireless devices utilizing the first and/or second RATs, respectively, may identify transmission timing scheme 300 that is allocated to or otherwise associated with a shared radio frequency spectrum band. The transmission timing scheme 300 may include a first set of time intervals allocated for transmissions using the first RAT and a second set of time intervals allocated for transmissions using the second RAT. For example, transmission timing scheme 300 includes a first time interval 305 of the first set of time intervals allocated for transmissions using the first RAT (e.g., $T_1$ for LTE-V2X transmissions) and a second time interval 310 of the second set of time intervals allocated for transmissions using the second RAT (e.g., $T_1$ for ITS-G5 transmissions). In some aspects, the channel reservation signals may be transmitted using a wideband signal to improve reception by the second wireless devices using the second RAT.

From the perspective of the first wireless device, the first wireless device may identify the transmission timing scheme 300 and transmit a channel reservation signal (e.g., a CTS 315) before starting a transmission (e.g., the LTE-V2X transmission 320) over the shared radio frequency spectrum band. The channel reservation signal (e.g., CTS 315) may carry or convey an indication of an end time of the first time interval 305 and an indication that the channel reservation signal is transmitted using the first RAT. For example, a network allocation vector (NAV) (e.g., $T_{NAV1}$ 325) may be set or otherwise configured to convey an indication of the end time of the first time interval 305. The NAV in the channel reservation signal may be configured to indicate the end time of the first time interval (e.g., $T_{NAV1}$ 325 for LTE transmissions) that is reserved for transmissions using the first RAT (e.g., LTE-V2X transmissions), regardless of the actual transmission time of the channel reservation signal. That is, conventionally the NAV would be set to a value corresponding to the amount of data and/or time used for the LTE-V2X transmission 320. However, according to aspects of the described techniques the NAV is set to a value corresponding to the end time of the first time interval 305 of the first set of time intervals allocated for transmission using the first RAT. Thus, the $T_{NAV}$ values may be set by the respective wireless devices using the first RAT to identify the end time of the first time interval 305.

In some aspects, the channel reservation signal may also be configured to carry or convey an indication that the first wireless device uses the first RAT. For example, one or more bits, fields, and the like, of the channel reservation signal can be used to identify the channel reservation signal as corresponding to an LTE-V2X transmission. In one example, the identification that the channel reservation signal is associated with the transmissions using the first RAT may be based on a specific receiver address (RA) that is adopted for identifying LTE-V2X transmissions. In another example, the identification that the channel reservation signal is associated with transmission using the first RAT may be based on assigning specific fields to LTE-V2X transmissions, e.g., a specific set of $T_{NAV1}$ 325 durations may be reserved for LTE-V2X transmissions.

Moreover, an additional wireless device using the first RAT may also transmit a channel reservation signal (e.g., CTS 330) over the shared radio frequency spectrum band prior to transmitting a signal (e.g., an LTE-V2X transmission 335) over the shared radio frequency spectrum band. In some aspects, the channel reservation signal (e.g., CTS 330) may also carry or convey an indication of an end time (e.g., $T_{NAV2}$ 340) from the perspective of the additional wireless device. That is, the end time indicated in the CTS 315 (e.g., the $T_{NAV1}$ 325) may be different from the end time indicated in the CTS 330 (e.g., the $T_{NAV2}$ 340) due to the time difference between the end time of the first time interval 305 and the transmission time of the respective channel reservation signal.

In some aspects, the additional wireless device may detect the channel reservation signal (e.g., CTS 315) from the first wireless device and identify the transmission timing scheme 300 and/or the end time of the first time interval 305 from the channel reservation signal (e.g., CTS 315). In another example, the additional wireless device may detect the channel reservation signal (e.g., CTS 315), but may independently determine the end time of the first time interval 305 based on the transmission time of its own channel reservation signal (e.g., CTS 330).

Generally, one or more of the channel reservation signals transmitted by wireless devices using the first RAT may be used by wireless devices using a second RAT to reserve the shared radio frequency spectrum band for transmissions using the first RAT during the first time interval 305. In some aspects, this may include the second wireless devices using the second RAT determining or otherwise identifying that the channel reservation signal(s) are associated with the first RAT. This may signal to the second wireless device that one or more wireless devices are performing transmissions over the shared radio frequency spectrum band using the first RAT. Accordingly, the second wireless device may determine the end time of the first time interval 305 from the channel reservation signals (e.g., from one or both of CTS 315 and CTS 330). Accordingly, the second wireless device devices may refrain from transmitting over the shared radio frequency spectrum band until at least the end time of the first time interval 305 (e.g., during the time interval of the first set of time intervals that are used for transmissions using the first RAT).

Instead, the second wireless device may identify the second time interval 310 (e.g., $T_1$ for ITS-G5 transmissions) of the second set of time intervals that are used for transmissions using the second RAT. For example, the second wireless device may perform an ITS-G5 transmission 345, an ITS-G5 transmission 350, and/or an ITS-G5 transmission 355 using the second RAT. However, it is to be understood that one or more other wireless devices using the second RAT may perform the ITS-G5 transmissions 345, 350, and/or 355, e.g., based on receiving the channel reservation signals from the first wireless devices using the first RAT.

That is, the second wireless device may determine that the channel reservation signals include a NAV indication (e.g., the end time indication) that was set by the first wireless device using the first RAT, which may signal to the second wireless device to acquire the LTE timing (e.g., identify the transmission timing scheme 300 and/or the end time of the first time interval 305). This may signal to the second wireless device that it needs to back off from transmissions following the NAV indication and limit its next transmission opportunity to within the next $T_1$, e.g., to limit ITS transmissions using the second RAT until the second time interval 310). Thus, the second wireless device may limit ITS transmissions to within the second time interval 310 based on the channel reservation signals received from the first wireless devices using the first RAT and indicating the end time of the first time interval 305.

As discussed above, in some examples the duration of the first time interval 305 may be set to a multiple of TTI durations based on a finite set of durations being needed to support LTE-V2X transmissions. In this example, a set of NAVs may be identified for the transmissions using the first RAT, with each NAV in the set of NAVs corresponding to a time difference between transmission of the channel reservation signal and the end time of the first time interval 305. Accordingly, the first wireless devices transmitting the channel reservation signal (e.g., CTS 315 and/or CTS 330) may select a particular NAV from the set of NAVs based on when the channel reservation signal is transmitted during the first time interval 305. For example, the CTS 315 may indicate a value for $T_{NAV1}$ 325 that is selected based on when CTS 315 is transmitted during the first time interval 305. Similarly, the CTS 330 may indicate a value for $T_{NAV2}$ 340 that that is selected based on when CTS 330 is transmitted during the first time interval 305. Any of the NAV values indicated in the respective channel reservation signals (e.g., CTS 315 and/or CTS 330) may be selected from the set of NAVs allocated to or otherwise associated with transmissions using the first RAT.

In some aspects, different NAV values may be used for, or otherwise associated with, the respective RATs. For example, a first set of NAVs may be associated with transmissions using the first RAT with a second set of NAVs being associated with transmissions using the second RAT. The selection of a particular NAV from the first set of NAVs may carry or convey the indication that the channel reservation signal is transmitted from a device using the first RAT.

As discussed, some examples may include using a DCI as the channel reservation signal. For example, a DCI may be transmitted as a channel reservation signal, with the DCI scheduling a particular TxOP. In this example, the TxOP scheduled by the DCI may correspond to the first time interval 305. Accordingly, the DCI scheduling the TxOP may carry or convey an indication of the end time of the first time interval 305 (e.g., the TxOP), rather than an indication of the time period for the particular LTE transmission.

Figure 4:
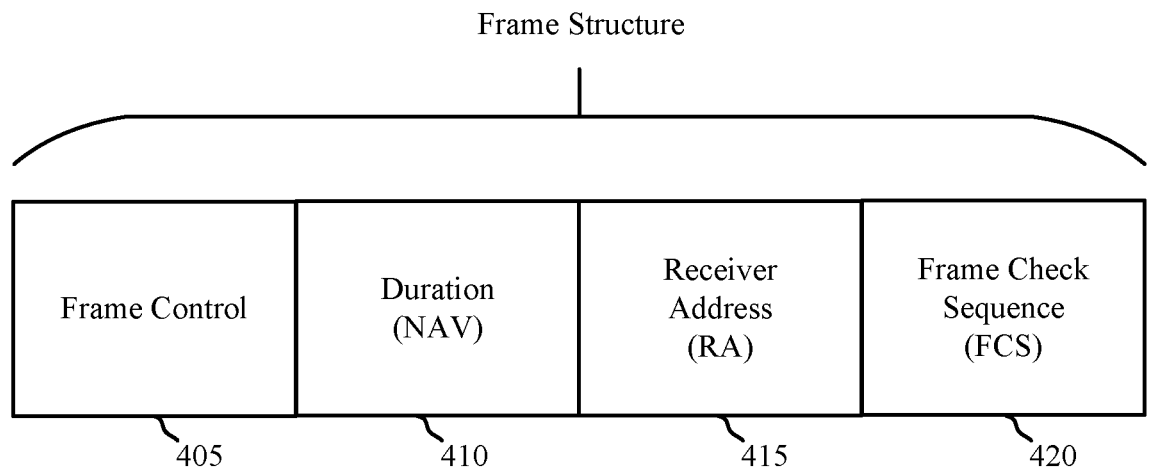
FIG. 4 illustrates an example of a frame structure that supports techniques to synchronize RATs for co-channel operation in accordance with aspects of the present disclosure.

FIG. 4 illustrates an example of a frame structure 400 that supports techniques to synchronize RATs for co-channel operation in accordance with aspects of the present disclosure. In some examples, frame structure 400 may implement aspects of wireless communications systems 100 and 200 and/or transmission timing scheme 300. Aspects of frame structure 400 may be implemented by a wireless device using the first RAT, in accordance with aspects of the described techniques.

As discussed above, aspects of the described techniques may include a first wireless device identifying a transmission timing scheme that includes a first set of time intervals allocated for transmitting using a first RAT and a second set of time intervals allocated for transmissions using a second RAT. The first wireless device may then transmit a channel reservation signal that carries or conveys an indication of an end time for a time interval of the first set of time intervals as well as an indication that the first wireless device uses the first RAT. Frame structure 400 illustrates one example of a frame that can be used in the channel reservation signal in accordance with aspects of the described techniques.

In some examples, frame structure 400 illustrates an example CTS frame structure (or an example CTS-to-Self frame structure) that includes a frame control field 405, a duration field 410, and RA field 415, and a frame check sequence (FCS) field 420. Generally, the frame control field 405 may carry various frame-related information, such as the type of frame (e.g., control, management, or data) as well as provides various control information. In some aspects, the control information may indicate whether the frame is to or from a distributed system, fragmentation information, privacy information, and the like.

In some aspects, the duration field 410 may be used to carry or convey an indication of the end time of the time interval from the first set of time intervals. In some aspects, this may include the duration field 410 being used as a NAV that indicates the end time of the time interval. For example, the duration field 410 may be configured to indicate the absolute end time of the time interval and/or the relative end time, e.g., an indication of a time difference between transmission of the channel reservation signal using frame structure 400 and the end time of the time interval. As discussed, the NAV may be selected from a set of NAVs.

In some aspects, the RA field 415 may be used to carry or convey the indication that the channel reservation signal using frame structure 400 is transmitted from the first wireless device using the first RAT. For example, an identifier of the first wireless device and/or an identifier of the first RAT may be configured in the RA field to carry or convey the indication that the first wireless device uses the first RAT. In one example, frame structure 400 may be a CTS-to-Self frame structure where the RA field 415 is set to the address of the first wireless device, which in this example is the transmitter of the CTS-to-Self frame. This may carry or convey the indication that the first wireless device uses the first RAT, in some examples. In some aspects, the FCS field 420 may carry or convey an indication of information used for error correction (e.g., CRC bits). Accordingly, frame structure 400 may be used in a channel reservation signal indicating the end time and that the first wireless device uses the first RAT.

Though described with reference to a CTS or CTS-to-Self frame structure, other frame structures supporting an indication of the end time of the time interval, indicating a RAT associated with the transmitting wireless device (e.g., the first wireless device), or both, may be used in accordance with the techniques described herein. In some examples, one frame, message, or signal may convey an indication of the end time of the time interval, while a second frame, message, or signal may convey an indication of the RAT associated with the transmitting wireless device. In some cases, a channel reservation signal and/or an indication of an end time may be transmitted in a message field (e.g., a preamble, a header, a field etc.), and in some cases, the message field may be compatible with one or more releases and/or version of a 3rd Generation Partnership Project (3GPP) standard. In some additional or alternative cases, the message field may be compatible with one or more versions of an IEEE standard.

Figure 5:
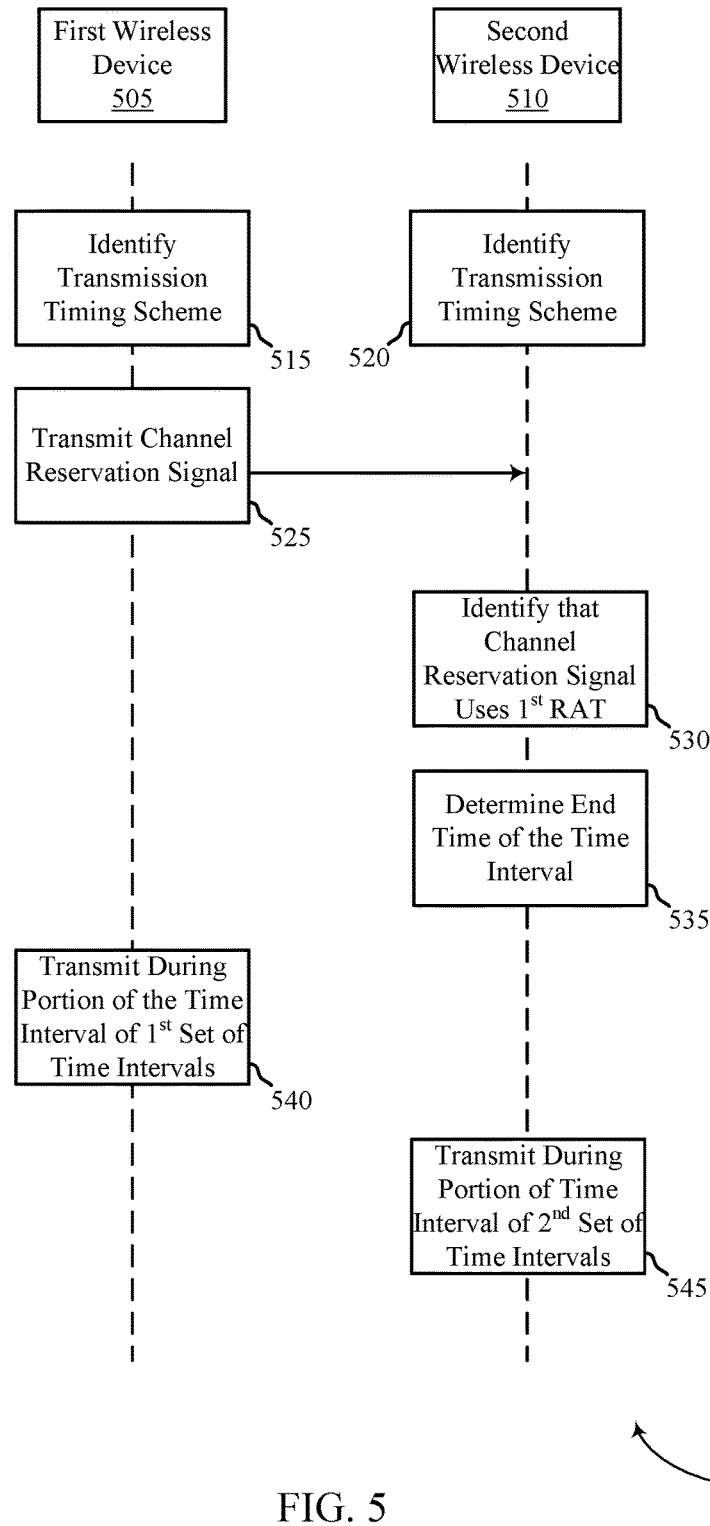
FIG. 5 illustrates an example of a process that supports techniques to synchronize RATs for co-channel operation in accordance with aspects of the present disclosure.

FIG. 5 illustrates an example of a process 500 that supports techniques to synchronize RATs for co-channel operation in accordance with aspects of the present disclosure. In some examples, process 500 may implement aspects of wireless communications systems 100 and 200, transmission timing scheme 300, and/or frame structure 400. Aspects of process 500 may be implemented by a first wireless device 505 that uses the first RAT and a second wireless device 510 that uses a second RAT, which may be examples of the corresponding devices described herein.

At 515, the first wireless device 505 may determine or otherwise identify a transmission timing scheme for a shared radio frequency spectrum band. In some aspects, the transmission timing scheme may include a first set of time intervals that are allocated for transmissions using a first RAT and a second set of time intervals that are allocated for transmissions using a second RAT. In some aspects, the first wireless device 505 may identify the transmission timing scheme based on receiving a configuration signal identifying the transmission timing scheme. In some aspects, this may include the first wireless device 505 identifying the transmission timing scheme based on preconfigured information.

In some aspects, the first RAT may be a cellular based RAT and the second RAT may be any non-cellular based RAT. In some aspects, the first RAT may be an LTE-V2X RAT, and the second RAT may be an IEEE 802.11 based RAT, e.g., an ITS-G5 802.11p RAT.

At 520, the second wireless device 510 may determine or otherwise identify the transmission timing scheme that is used for the shared radio frequency spectrum band. Again, the transmission timing scheme may include a first set of time intervals that are used for transmissions using the first RAT and a second set of time intervals that are used for transmissions using the second RAT. The second wireless device 510 may receive a configuration signal configuring or otherwise identifying the transmission timing scheme and/or may be preconfigured with the transmission timing scheme information.

At 525, the first wireless device 505 may transmit (and the second wireless device 510 may receive) a channel reservation signal during a time interval of the first set of time intervals. In some aspects, the channel reservation signal may carry or convey an indication of an end time of the time interval and that the first wireless device 505 uses the first RAT. In some aspects, this may include the first wireless device 505 determining a time difference between the end time of the time interval and a transmission time of the channel reservation signal. In this example, the first wireless device 505 may configure the channel reservation signal to carry or convey an indication of the time difference. In some aspects, this may include the first wireless device 505 configuring an RA field of the channel reservation signal to indicate that the first wireless device 505 uses the first RAT.

In some aspects, this may include the first wireless device 505 configuring a NAV field (e.g., duration field) of the channel reservation signal to indicate the end time of the time interval. For example, the first wireless device 505 may identify a set of NAVs, with each NAV in the set of NAVs corresponding to a unique time difference between transmission of the channel reservation signal and the end time of the time interval. The first wireless device 505 may select the NAV from the set of NAVs based at least in part on the time difference. In some aspects, this may include a first set of NAVs that are associated with using the first RAT and a second set of NAVs that are associated with using the second RAT. The first wireless device 505 may select the NAV from the first set of NAVs based at least in part on the first wireless device 505 using the first RAT.

In some aspects, this may include the first wireless device 505 configuring a DCI scheduling a TxOP as the channel reservation signal to indicate the end time of the time interval. In some aspects, this may include the first wireless device 505 receiving a previous channel reservation signal during the time interval of the first set of time intervals from a different wireless device (not shown). The first wireless device 505 may identify the end time of the time interval based at least in part on the previous channel reservation signal. In some aspects, the channel reservation signal may be one or more of a CTS signal, a CTS-to-Self signal, a DCI, and the like.

At 530, the second wireless device 510 may identify that the received channel reservation signal is associated with the first RAT. In some aspects, this may include the second wireless device 510 decoding an RA field of the channel reservation signal to identify that the channel reservation signal is configured using the first RAT. In some aspects, this may include the second wireless device 510 identifying that the first wireless device 505 uses the first RAT based on a decoded NAV (e.g., a NAV that is associated with, or otherwise allocated to, devices using the first RAT).

At 535, the second wireless device 510 may determine and end time of the time interval based at least in part on the indication that the received channel reservation signal is associated with the first RAT. In some aspects, this may include the second wireless device 510 decoding a NAV of the channel reservation signal to identify the end time of the time interval of the first set of time intervals. For example, the second wireless device 510 may identify a set of NAVs, with each NAV in the set of NAVs corresponding to a unique time difference between transmission of the channel reservation signal and the end time of the time interval. The second wireless device 510 may identify the end time based at least in part on the decoded NAV from the set of NAVs.

In some aspects, this may include the second wireless device 510 identifying the first set of NAVs associated with using the first RAT and the second set of NAVs associated with using the second RAT. The second wireless device 510 may identify that the channel reservation signal is configured using the first RAT based at least in part on the decoded NAV being from the first set of NAVs.

At 540, the first wireless device 505 may transmit over the shared radio frequency spectrum band during at least a portion of the time interval that occurs before the end time of the time interval. Correspondingly, the second wireless device 510 may refrain from transmitting over the shared radio frequency spectrum band until at least the end time of the time interval.

At 545, the second wireless device 510 may transmit over the shared radio frequency spectrum band during at least a portion of a second time interval of the second set of time intervals. Correspondingly, the first wireless device 505 may refrain from transmitting over the shared radio frequency spectrum band until at least an end time of the second time interval.

In some aspects, this may include the second wireless device 510 monitoring the shared radio frequency spectrum band during one or more subsequent time intervals of the first set of time intervals to determine whether or not channel reservation signals are detected. If no channel reservation signals are detected, the second wireless device 510 may transmit over the shared radio frequency spectrum band during the monitored time interval based at least in part on the absence of channel reservation signals during the time interval.

In some aspects, this may include the first wireless device 505 transmitting over the shared radiofrequency spectrum band during one or more time intervals of the first set of time intervals and then refraining from transmitting over the shared radio frequency spectrum band during time intervals of the second set of time intervals. Conversely, in some aspects this may include the second wireless device 510 transmitting over the shared radio frequency spectrum band during one or more time intervals of the second set of time intervals and then refraining from transmitting over the shared radio frequency spectrum band during time intervals of the first set of time intervals.

In some aspects, the duration of the time intervals in the first set of time intervals may be the same as, or may be different from, the durations of the time intervals in the second set of time intervals.

Figure 6:
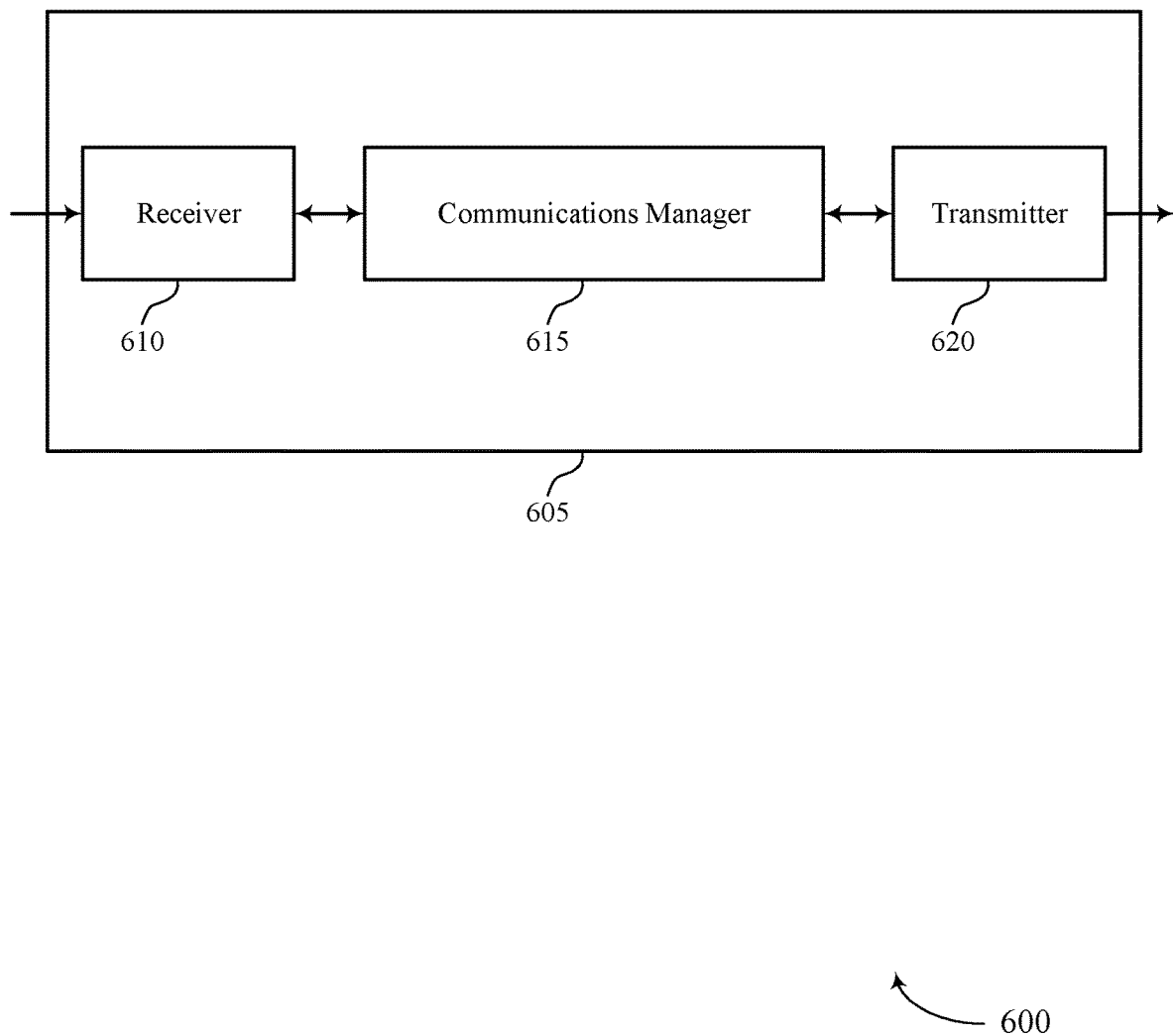
FIGS. 6 and 7 show block diagrams of devices that support techniques to synchronize RATs for co-channel operation in accordance with aspects of the present disclosure.

FIG. 6 shows a block diagram 600 of a device 605 that supports techniques to synchronize RATs for co-channel operation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques to synchronize RATs for co-channel operation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT, transmit, during a time interval of the first set of time intervals, a channel reservation signal indicating an end time of the time interval and indicating that the wireless device uses the first RAT, and transmit, based on the transmitted channel reservation signal, over the shared radio frequency spectrum band during at least a portion of the time interval before the end time of the time interval.

The communications manager 615 may also identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT, receive, during a time interval of the first set of time intervals, a channel reservation signal over the shared radio frequency spectrum band, identify that the received channel reservation signal is associated with the first RAT, determine an end time of the time interval based on the identification, and refrain from transmitting over the shared radio frequency spectrum band until at least the end time of the time interval. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
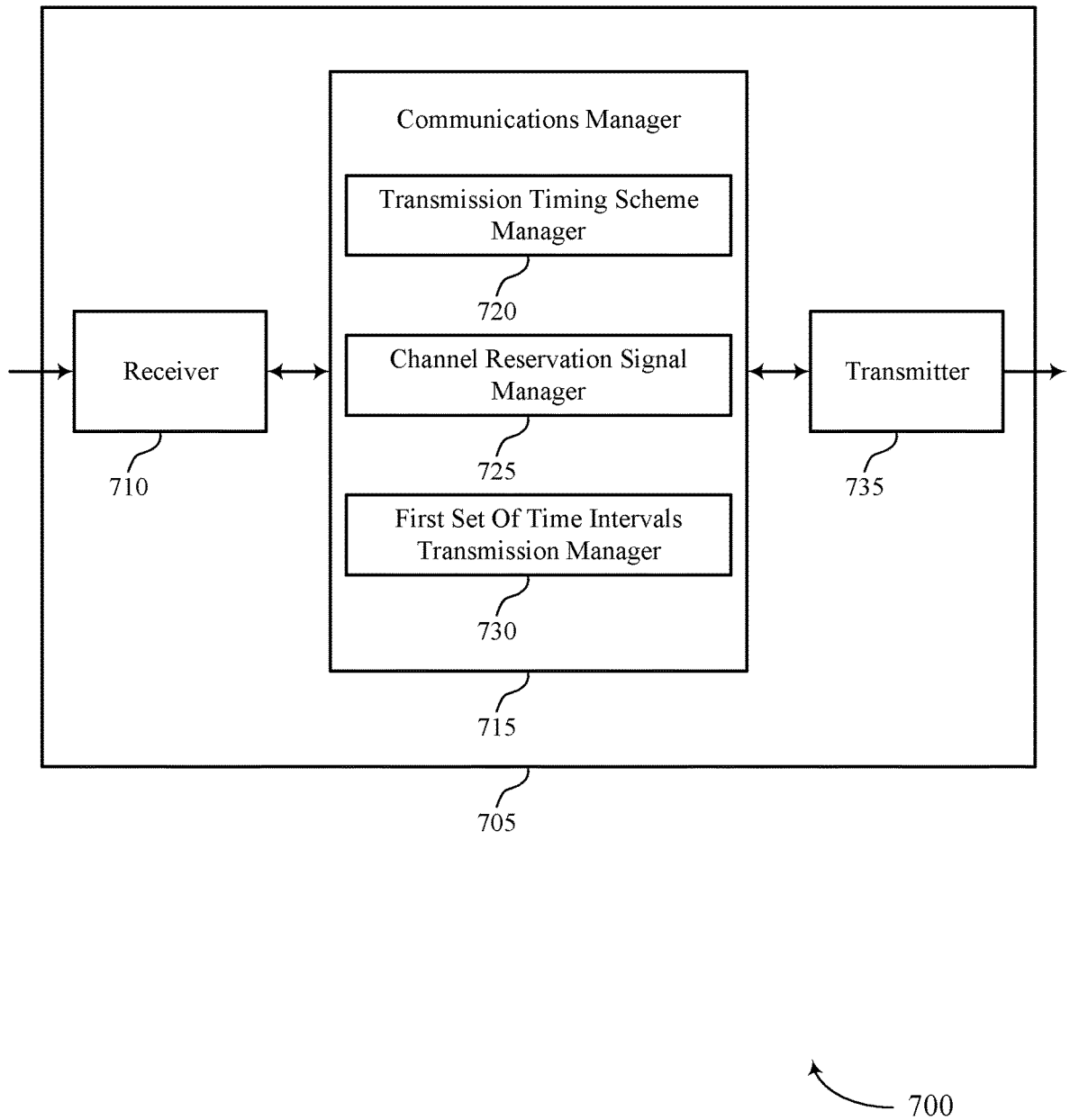

FIG. 7 shows a block diagram 700 of a device 705 that supports techniques to synchronize RATs for co-channel operation in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques to synchronize RATs for co-channel operation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a transmission timing scheme manager 720, a channel reservation signal manager 725, and a first set of time intervals transmission manager 730. The communications manager 715 may be an example of aspects of the communications manager 910 described herein.

The transmission timing scheme manager 720 may identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT.

The channel reservation signal manager 725 may transmit, during a time interval of the first set of time intervals, a channel reservation signal indicating an end time of the time interval and indicating that the wireless device uses the first RAT.

The first set of time intervals transmission manager 730 may transmit, based on the transmitted channel reservation signal, over the shared radio frequency spectrum band during at least a portion of the time interval before the end time of the time interval.

The transmission timing scheme manager 720 may identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT.

The channel reservation signal manager 725 may receive, during a time interval of the first set of time intervals, a channel reservation signal over the shared radio frequency spectrum band, identify that the received channel reservation signal is associated with the first RAT, and determine an end time of the time interval based on the identification.

The first set of time intervals transmission manager 730 may refrain from transmitting over the shared radio frequency spectrum band until at least the end time of the time interval.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
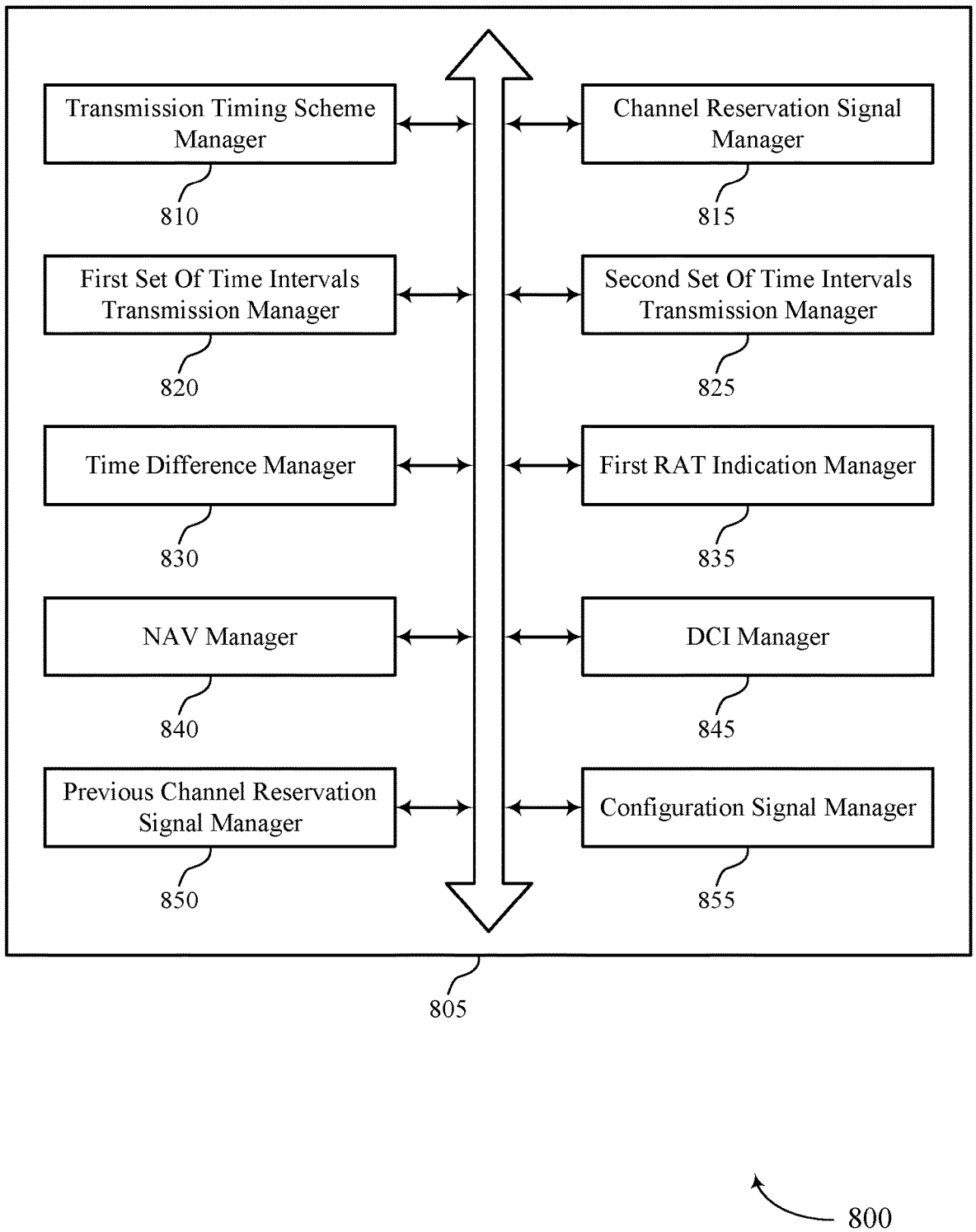
FIG. 8 shows a block diagram of a communications manager that supports techniques to synchronize RATs for co-channel operation in accordance with aspects of the present disclosure.

FIG. 8 shows a block diagram 800 of a communications manager 805 that supports techniques to synchronize RATs for co-channel operation in accordance with aspects of the present disclosure. The communications manager 805 may be an example of aspects of a communications manager 615, a communications manager 715, or a communications manager 910 described herein. The communications manager 805 may include a transmission timing scheme manager 810, a channel reservation signal manager 815, a first set of time intervals transmission manager 820, a second set of time intervals transmission manager 825, a time difference manager 830, a first RAT indication manager 835, a NAV manager 840, a DCI manager 845, a previous channel reservation signal manager 850, and a configuration signal manager 855. Each of these modules may communicate, directly or indirectly, with one another (e.g., via one or more buses).

The transmission timing scheme manager 810 may identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT.

In some examples, the transmission timing scheme manager 810 may identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT.

In some cases, the first RAT includes a cellular RAT and the second RAT includes an IEEE 802.11 based RAT. In some cases, a first duration of each time interval in the first set of time intervals is different from a second duration of each time interval in the second set of time intervals. In some cases, the first RAT includes a cellular RAT and the second RAT includes an IEEE 802.11 based RAT. In some cases, a first duration of each time interval in the first set of time intervals is different from a second duration of each time interval in the second set of time intervals.

The channel reservation signal manager 815 may transmit, during a time interval of the first set of time intervals, a channel reservation signal indicating an end time of the time interval and indicating that the wireless device uses the first RAT. In some examples, the channel reservation signal manager 815 may receive, during a time interval of the first set of time intervals, a channel reservation signal over the shared radio frequency spectrum band. In some examples, the channel reservation signal manager 815 may identify that the received channel reservation signal is associated with the first RAT. In some examples, the channel reservation signal manager 815 may determine an end time of the time interval based on the identification. In some cases, the channel reservation signal includes a CTS signal, or a CTS-to-self signal, or a DCI signal, or a combination thereof.

The first set of time intervals transmission manager 820 may transmit, based on the transmitted channel reservation signal, over the shared radio frequency spectrum band during at least a portion of the time interval before the end time of the time interval. In some examples, the first set of time intervals transmission manager 820 may refrain from transmitting over the shared radio frequency spectrum band until at least the end time of the time interval.

The second set of time intervals transmission manager 825 may refrain from transmitting over the shared radio frequency spectrum band during the second set of time intervals. In some examples, the second set of time intervals transmission manager 825 may monitor, during a second time interval of the first set of time intervals allocated for transmission using the first RAT, the shared radio frequency spectrum band for channel reservation signals associated with the first RAT.

In some examples, the second set of time intervals transmission manager 825 may transmit over the shared radio frequency spectrum band during the second time interval based on identifying, based on the monitoring, an absence of channel reservation signals received by the wireless device during the second time interval. In some examples, the second set of time intervals transmission manager 825 may transmit over the shared radio frequency spectrum band during the second set of time intervals.

The time difference manager 830 may determine a time difference between the end time of the time interval and a transmission time of the channel reservation signal. In some examples, the time difference manager 830 may transmit an indication of the determined time difference in the channel reservation signal to indicate the end time of the time interval.

The first RAT indication manager 835 may configure a receiver address field of the channel reservation signal to indicate that the wireless device uses the first RAT. In some examples, the first RAT indication manager 835 may decode a receiver address field of the channel reservation signal to identify that the channel reservation signal is configured using the first RAT.

The NAV manager 840 may configure a NAV of the channel reservation signal to indicate the end time of the time interval. In some examples, the NAV manager 840 may identify a set of NAVs, each NAV in the set of NAVs corresponding to a time difference between transmission of the channel reservation signal and the end time of the time interval. In some examples, the NAV manager 840 may select the NAV from the set of NAVs based on the time difference. In some examples, the NAV manager 840 may identify a first set of NAVs associated with using the first RAT and a second set of NAVs associated with using the second RAT. In some examples, the NAV manager 840 may select the NAV from the first set of NAVs based on the wireless device using the first RAT.

In some examples, the NAV manager 840 may decode a network allocation vector (NAV) of the channel reservation signal to identify the end time of the time interval of the first set of time intervals. In some examples, the NAV manager 840 may identify a set of NAVs, each NAV in the set of NAVs corresponding to a time difference between transmission of the channel reservation signal and the end time of the time interval.

In some examples, the NAV manager 840 may identify the end time based on the decoded NAV from the set of NAVs. In some examples, the NAV manager 840 may identify a first set of NAVs associated with using the first RAT and a second set of NAVs associated with using the second RAT. In some examples, the NAV manager 840 may identify that the channel reservation signal is configured using the first RAT based on the decoded NAV being from the first set of NAVs.

The DCI manager 845 may configure DCI scheduling a TXOP as the channel reservation signal to indicate the end time of the time interval. In some examples, the DCI manager 845 may decode a DCI scheduling a TXOP as the channel reservation signal to identify the end time of the time interval.

The previous channel reservation signal manager 850 may receive, from a second wireless device operating according to the first RAT, a previous channel reservation signal during the time interval of the first set of time intervals. In some examples, the previous channel reservation signal manager 850 may identify the end time of the time interval based on the previous channel reservation signal.

The configuration signal manager 855 may receive a configuration signal over the first RAT that indicates the transmission timing scheme, where the transmission timing scheme is identified based on the configuration signal. In some examples, the configuration signal manager 855 may receive a configuration signal over the second RAT that indicates the transmission timing scheme, where the transmission timing scheme is identified based on the configuration signal.

Figure 9:
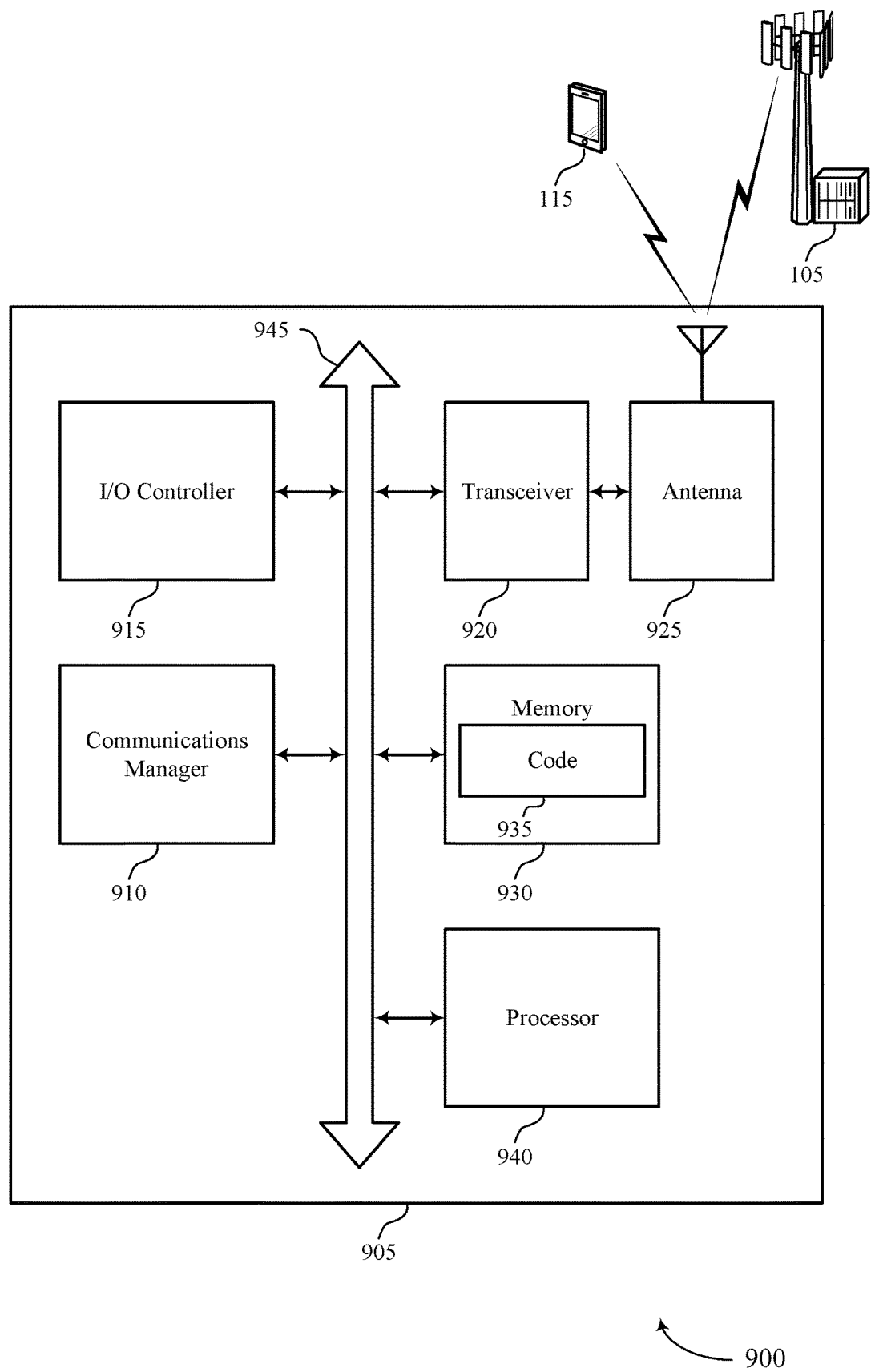
FIG. 9 shows a diagram of a system including a device that supports techniques to synchronize RATs for co-channel operation in accordance with aspects of the present disclosure.

FIG. 9 shows a diagram of a system 900 including a device 905 that supports techniques to synchronize RATs for co-channel operation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT, transmit, during a time interval of the first set of time intervals, a channel reservation signal indicating an end time of the time interval and indicating that the wireless device uses the first RAT, and transmit, based on the transmitted channel reservation signal, over the shared radio frequency spectrum band during at least a portion of the time interval before the end time of the time interval. The communications manager 910 may also identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT, receive, during a time interval of the first set of time intervals, a channel reservation signal over the shared radio frequency spectrum band, identify that the received channel reservation signal is associated with the first RAT, determine an end time of the time interval based on the identification, and refrain from transmitting over the shared radio frequency spectrum band until at least the end time of the time interval.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques to synchronize RATs for co-channel operation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
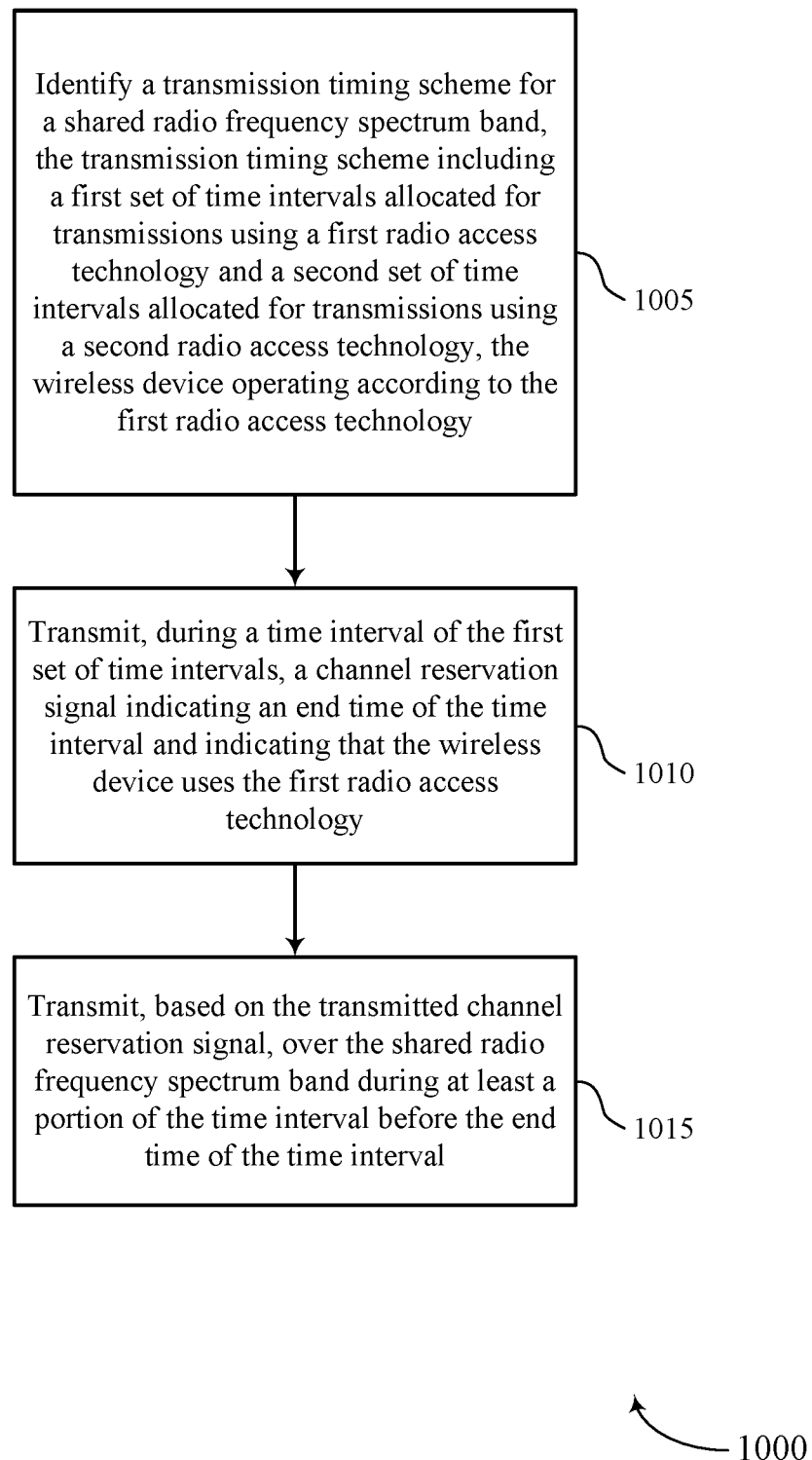
FIGS. 10 through 15 show flowcharts illustrating methods that support techniques to synchronize RATs for co-channel operation in accordance with aspects of the present disclosure.

FIG. 10 shows a flowchart illustrating a method 1000 that supports techniques to synchronize RATs for co-channel operation in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT. The operations of 1005 may be performed according to the methods described herein. In some examples, aspects of the operations of 1005 may be performed by a transmission timing scheme manager as described with reference to FIGS. 6 through 9.

At 1010, the UE may transmit, during a time interval of the first set of time intervals, a channel reservation signal indicating an end time of the time interval and indicating that the wireless device uses the first RAT. The operations of 1010 may be performed according to the methods described herein. In some examples, aspects of the operations of 1010 may be performed by a channel reservation signal manager as described with reference to FIGS. 6 through 9.

At 1015, the UE may transmit, based on the transmitted channel reservation signal, over the shared radio frequency spectrum band during at least a portion of the time interval before the end time of the time interval. The operations of 1015 may be performed according to the methods described herein. In some examples, aspects of the operations of 1015 may be performed by a first set of time intervals transmission manager as described with reference to FIGS. 6 through 9.

Figure 11:
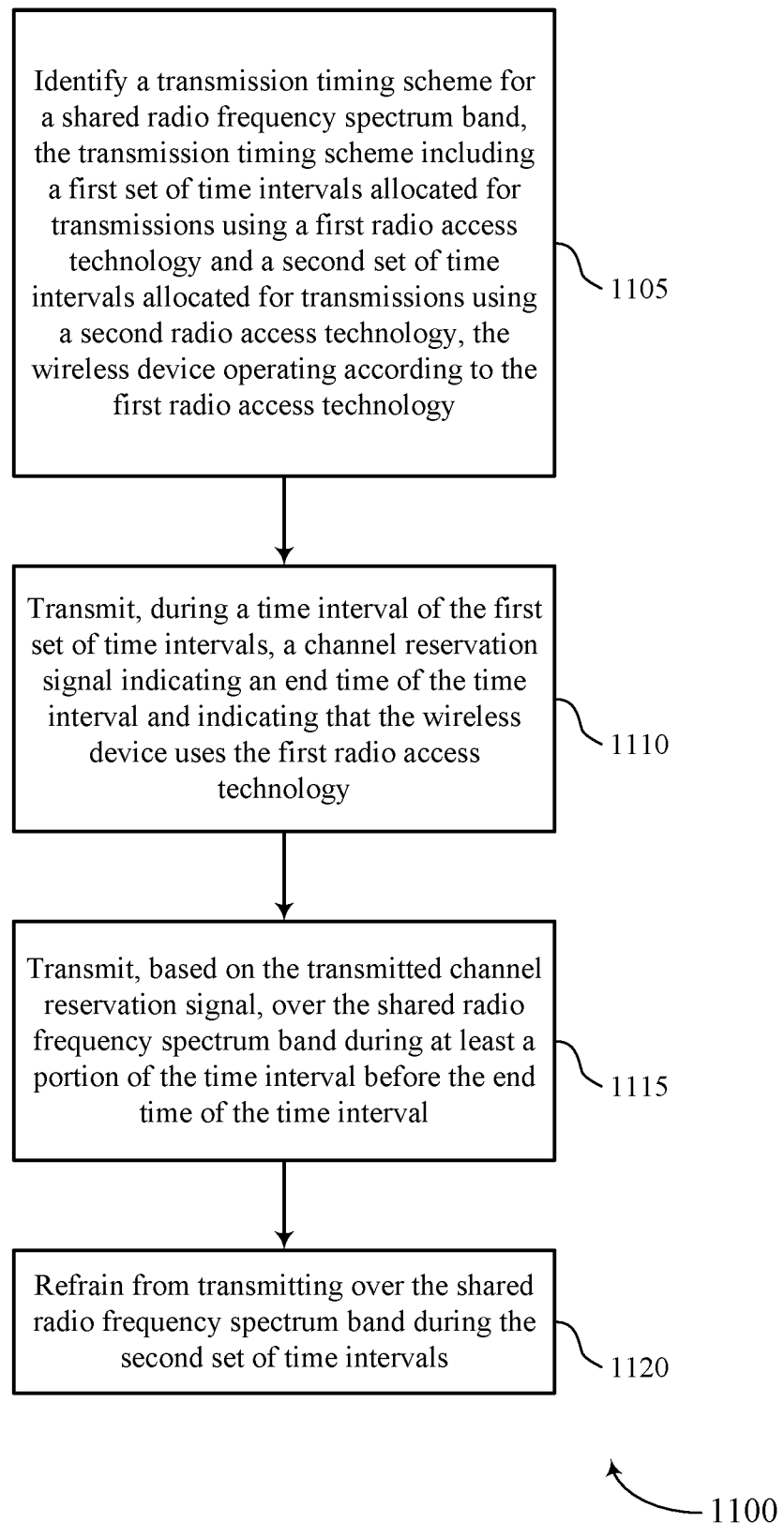

FIG. 11 shows a flowchart illustrating a method 1100 that supports techniques to synchronize RATs for co-channel operation in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT. The operations of 1105 may be performed according to the methods described herein. In some examples, aspects of the operations of 1105 may be performed by a transmission timing scheme manager as described with reference to FIGS. 6 through 9.

At 1110, the UE may transmit, during a time interval of the first set of time intervals, a channel reservation signal indicating an end time of the time interval and indicating that the wireless device uses the first RAT. The operations of 1110 may be performed according to the methods described herein. In some examples, aspects of the operations of 1110 may be performed by a channel reservation signal manager as described with reference to FIGS. 6 through 9.

At 1115, the UE may transmit, based on the transmitted channel reservation signal, over the shared radio frequency spectrum band during at least a portion of the time interval before the end time of the time interval. The operations of 1115 may be performed according to the methods described herein. In some examples, aspects of the operations of 1115 may be performed by a first set of time intervals transmission manager as described with reference to FIGS. 6 through 9.

At 1120, the UE may refrain from transmitting over the shared radio frequency spectrum band during the second set of time intervals. The operations of 1120 may be performed according to the methods described herein. In some examples, aspects of the operations of 1120 may be performed by a second set of time intervals transmission manager as described with reference to FIGS. 6 through 9.

Figure 12:
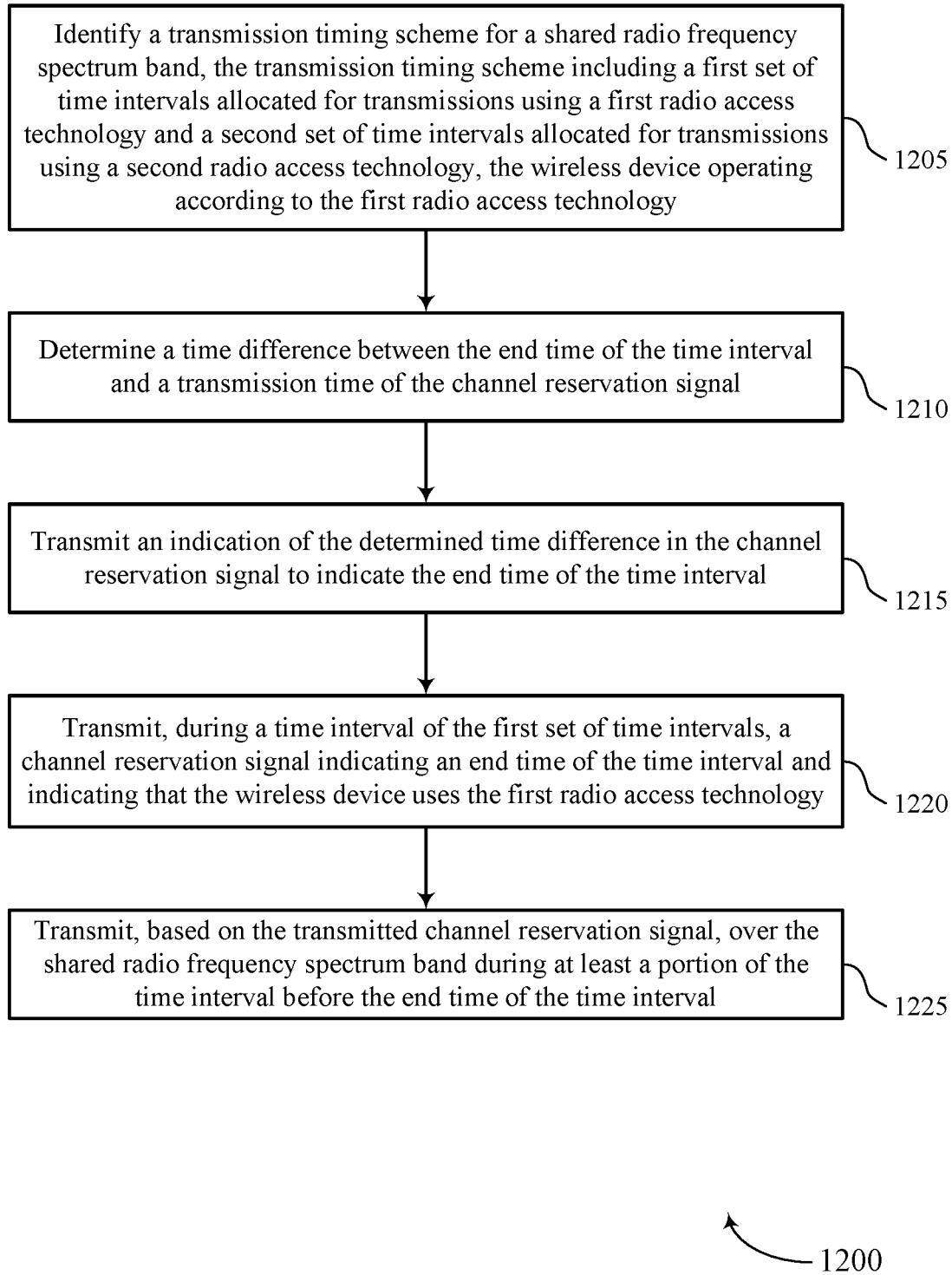

FIG. 12 shows a flowchart illustrating a method 1200 that supports techniques to synchronize RATs for co-channel operation in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may identify a transmission timing scheme for a shared radio frequency spectrum band, the transmission timing scheme including a first set of time intervals allocated for transmissions using a first RAT and a second set of time intervals allocated for transmissions using a second RAT, the wireless device operating according to the first RAT. The operations of 1205 may be performed according to the methods described herein. In some examples, aspects of the operations of 1205 may be performed by a transmission timing scheme manager as described with reference to FIGS. 6 through 9.

At 1210, the UE may determine a time difference between the end time of the time interval and a transmission time of the channel reservation signal. The operations of 1210 may be performed according to the methods described herein. In some examples, aspects of the operations of 1210 may be performed by a time difference manager as described with reference to FIGS. 6 through 9.

At 1215, the UE may transmit an indication of the determined time difference in the channel reservation signal to indicate the end time of the time interval. The operations of 1215 may be performed according to the methods described herein. In some examples, aspects of the operations of 1215 may be performed by a time difference manager as described with reference to FIGS. 6 through 9.

At 1220, the UE may transmit, during a time interval of the first set of time intervals, a channel reservation signal indicating an end time of the time interval and indicating that the wireless device uses the first RAT. The operations of 1220 may be performed according to the methods described herein. In some examples, aspects of the operations of 1220 may be performed by a channel reservation signal manager as described with reference to FIGS. 6 through 9.

At 1225, the UE may transmit, based on the transmitted channel reservation signal, over the shared radio frequency spectrum band during at least a portion of the time interval before the end time of the time interval. The operations of 1225 may be performed according to the methods described herein. In some examples, aspects of the operations of 1225 may be performed by a first set of time intervals transmission manager as described with reference to FIGS. 6 through 9.

Figure 13:
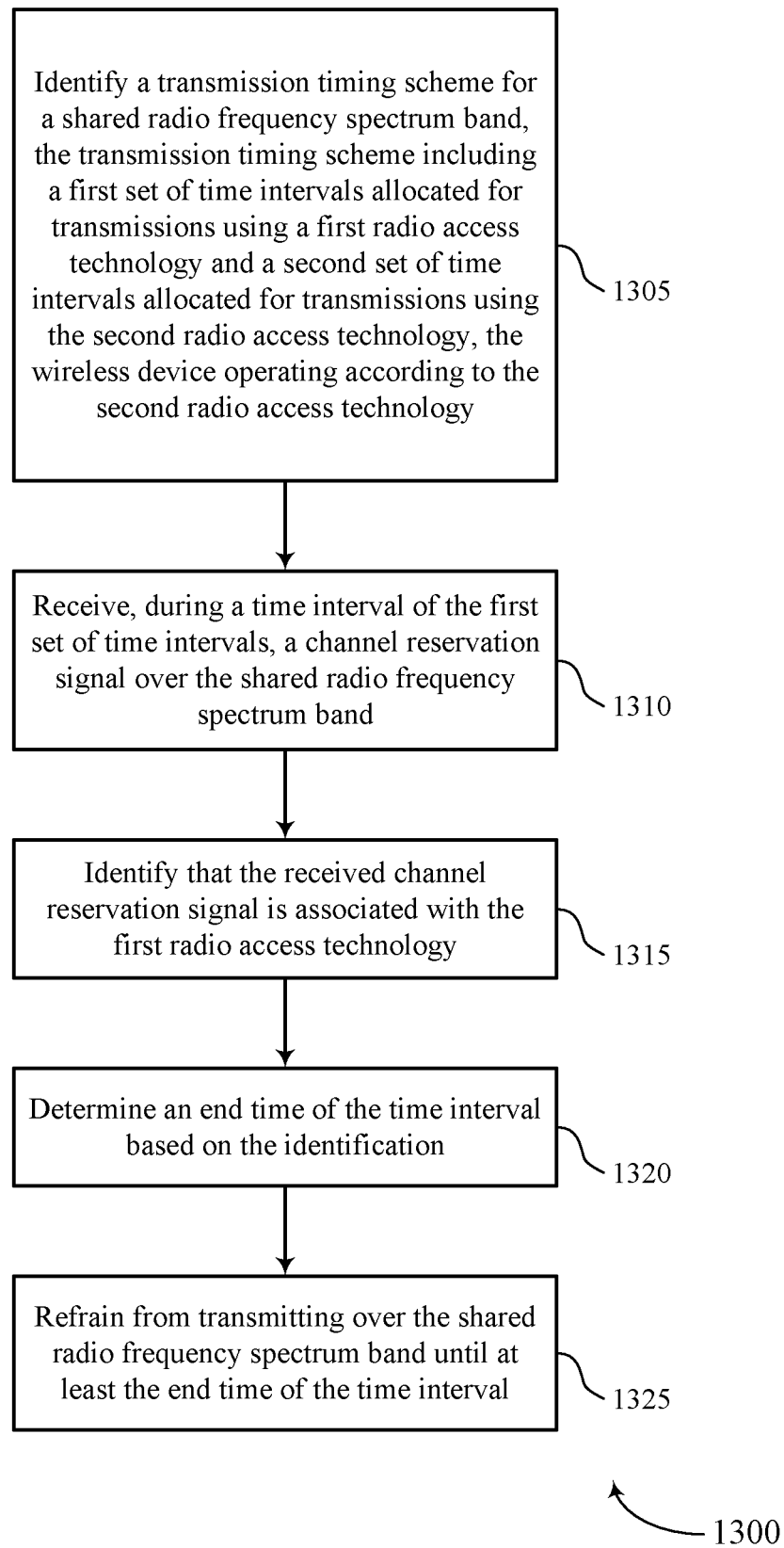

FIG. 13 shows a flowchart illustrating a method 1300 that supports techniques to synchronize RATs for co-channel operation in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT. The operations of 1305 may be performed according to the methods described herein. In some examples, aspects of the operations of 1305 may be performed by a transmission timing scheme manager as described with reference to FIGS. 6 through 9.

At 1310, the UE may receive, during a time interval of the first set of time intervals, a channel reservation signal over the shared radio frequency spectrum band. The operations of 1310 may be performed according to the methods described herein. In some examples, aspects of the operations of 1310 may be performed by a channel reservation signal manager as described with reference to FIGS. 6 through 9.

At 1315, the UE may identify that the received channel reservation signal is associated with the first RAT. The operations of 1315 may be performed according to the methods described herein. In some examples, aspects of the operations of 1315 may be performed by a channel reservation signal manager as described with reference to FIGS. 6 through 9.

At 1320, the UE may determine an end time of the time interval based on the identification. The operations of 1320 may be performed according to the methods described herein. In some examples, aspects of the operations of 1320 may be performed by a channel reservation signal manager as described with reference to FIGS. 6 through 9.

At 1325, the UE may refrain from transmitting over the shared radio frequency spectrum band until at least the end time of the time interval. The operations of 1325 may be performed according to the methods described herein. In some examples, aspects of the operations of 1325 may be performed by a first set of time intervals transmission manager as described with reference to FIGS. 6 through 9.

Figure 14:
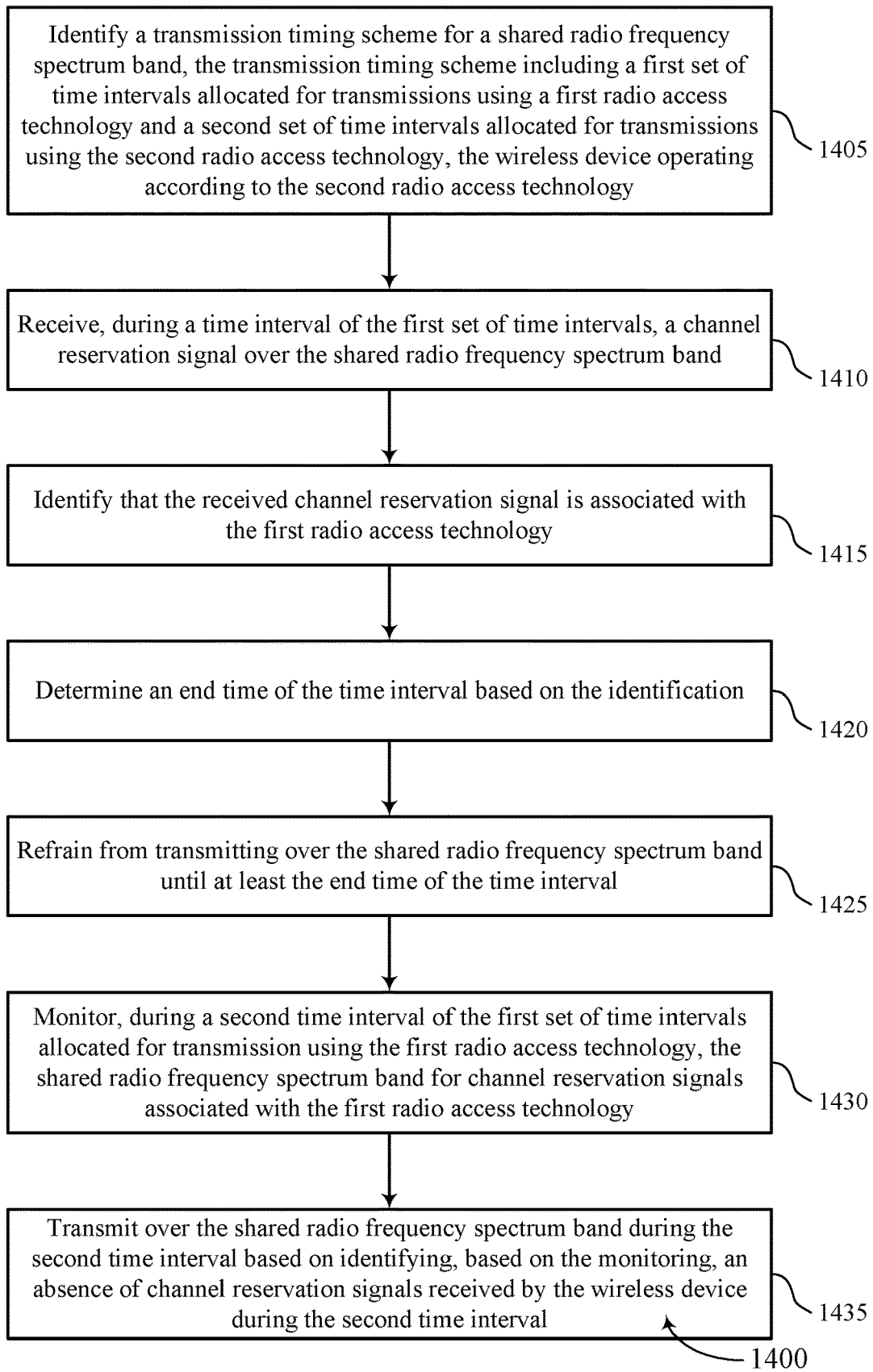

FIG. 14 shows a flowchart illustrating a method 1400 that supports techniques to synchronize RATs for co-channel operation in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT. The operations of 1405 may be performed according to the methods described herein. In some examples, aspects of the operations of 1405 may be performed by a transmission timing scheme manager as described with reference to FIGS. 6 through 9.

At 1410, the UE may receive, during a time interval of the first set of time intervals, a channel reservation signal over the shared radio frequency spectrum band. The operations of 1410 may be performed according to the methods described herein. In some examples, aspects of the operations of 1410 may be performed by a channel reservation signal manager as described with reference to FIGS. 6 through 9.

At 1415, the UE may identify that the received channel reservation signal is associated with the first RAT. The operations of 1415 may be performed according to the methods described herein. In some examples, aspects of the operations of 1415 may be performed by a channel reservation signal manager as described with reference to FIGS. 6 through 9.

At 1420, the UE may determine an end time of the time interval based on the identification. The operations of 1420 may be performed according to the methods described herein. In some examples, aspects of the operations of 1420 may be performed by a channel reservation signal manager as described with reference to FIGS. 6 through 9.

At 1425, the UE may refrain from transmitting over the shared radio frequency spectrum band until at least the end time of the time interval. The operations of 1425 may be performed according to the methods described herein. In some examples, aspects of the operations of 1425 may be performed by a first set of time intervals transmission manager as described with reference to FIGS. 6 through 9.

At 1430, the UE may monitor, during a second time interval of the first set of time intervals allocated for transmission using the first RAT, the shared radio frequency spectrum band for channel reservation signals associated with the first RAT. The operations of 1430 may be performed according to the methods described herein. In some examples, aspects of the operations of 1430 may be performed by a second set of time intervals transmission manager as described with reference to FIGS. 6 through 9.

At 1435, the UE may transmit over the shared radio frequency spectrum band during the second time interval based on identifying, based on the monitoring, an absence of channel reservation signals received by the wireless device during the second time interval. The operations of 1435 may be performed according to the methods described herein. In some examples, aspects of the operations of 1435 may be performed by a second set of time intervals transmission manager as described with reference to FIGS. 6 through 9.

Figure 15:
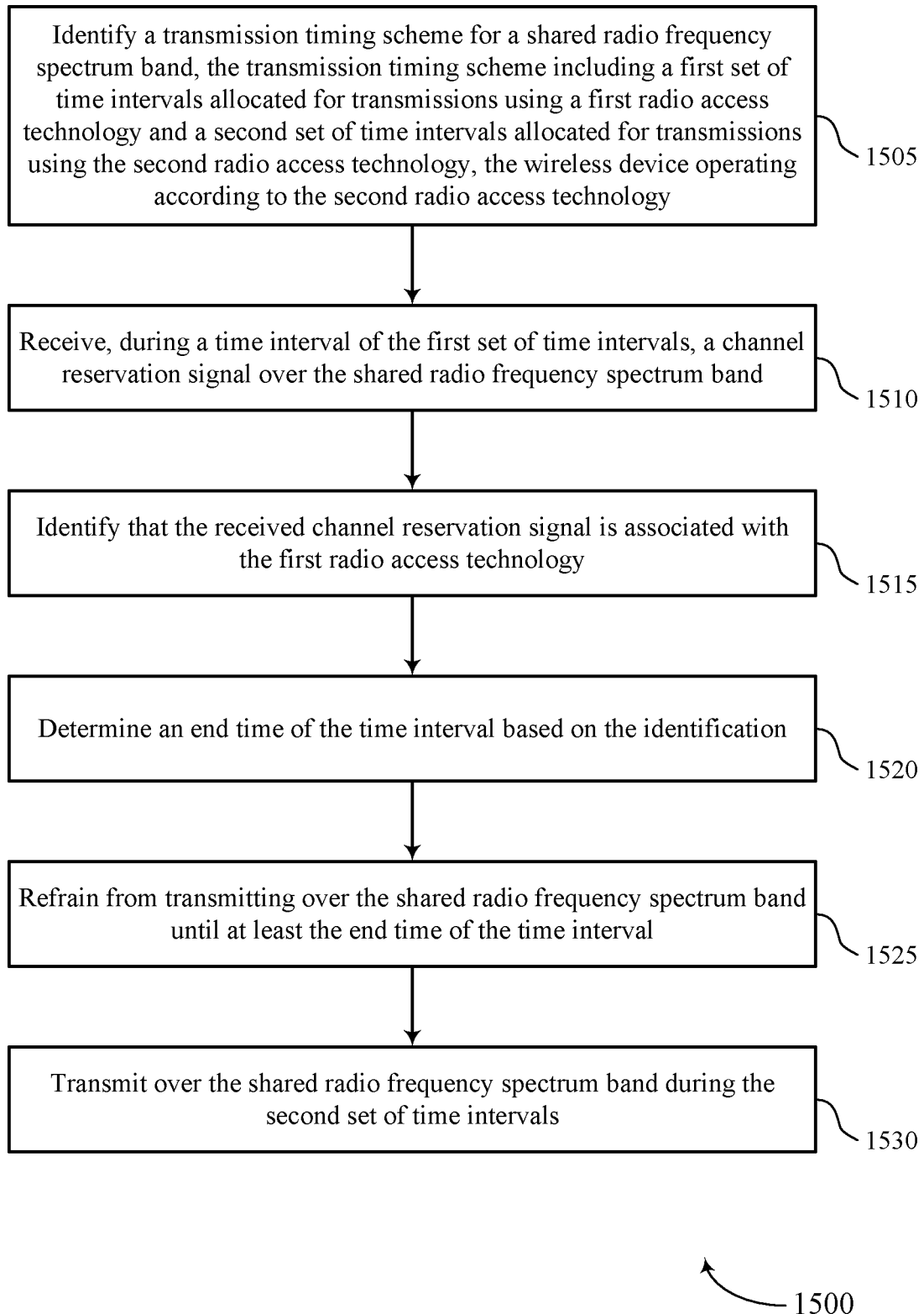

FIG. 15 shows a flowchart illustrating a method 1500 that supports techniques to synchronize RATs for co-channel operation in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a transmission timing scheme for a shared radio frequency spectrum band, the transmission timing scheme including a first set of time intervals allocated for transmissions using a first RAT and a second set of time intervals allocated for transmissions using the second RAT, the wireless device operating according to the second RAT. The operations of 1505 may be performed according to the methods described herein. In some examples, aspects of the operations of 1505 may be performed by a transmission timing scheme manager as described with reference to FIGS. 6 through 9.

At 1510, the UE may receive, during a time interval of the first set of time intervals, a channel reservation signal over the shared radio frequency spectrum band. The operations of 1510 may be performed according to the methods described herein. In some examples, aspects of the operations of 1510 may be performed by a channel reservation signal manager as described with reference to FIGS. 6 through 9.

At 1515, the UE may identify that the received channel reservation signal is associated with the first RAT. The operations of 1515 may be performed according to the methods described herein. In some examples, aspects of the operations of 1515 may be performed by a channel reservation signal manager as described with reference to FIGS. 6 through 9.

At 1520, the UE may determine an end time of the time interval based on the identification. The operations of 1520 may be performed according to the methods described herein. In some examples, aspects of the operations of 1520 may be performed by a channel reservation signal manager as described with reference to FIGS. 6 through 9.

At 1525, the UE may refrain from transmitting over the shared radio frequency spectrum band until at least the end time of the time interval. The operations of 1525 may be performed according to the methods described herein. In some examples, aspects of the operations of 1525 may be performed by a first set of time intervals transmission manager as described with reference to FIGS. 6 through 9.

At 1530, the UE may transmit over the shared radio frequency spectrum band during the second set of time intervals. The operations of 1530 may be performed according to the methods described herein. In some examples, aspects of the operations of 1530 may be performed by a second set of time intervals transmission manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A wireless device for wireless communication, comprising:
   one or more memories storing processor-executable code; and
   one or more processors coupled with the one or more memories and individually or collectively operable to execute the code to cause the wireless device to:
   receive a configuration signal over a first radio access technology that indicates a transmission timing scheme for a shared radio frequency spectrum band, the transmission timing scheme comprising a first set of time intervals allocated for transmissions using the first radio access technology and a second set of time intervals allocated for transmissions using a second radio access technology different from the first radio access technology, the wireless device operating according to the first radio access technology;
   transmit, during a time interval of the first set of time intervals, a channel reservation signal detectable by a device operating according to the second radio access technology, the channel reservation signal indicating that the wireless device uses the first radio access technology; and
   transmit, based at least in part on the channel reservation signal, a transmission over the shared radio frequency spectrum band during at least a portion of the time interval of the first set of time intervals.

2. The wireless device of claim 1, wherein, to transmit the channel reservation signal, the one or more processors are individually or collectively operable to execute the code to cause the wireless device to:
   transmit an indication of a first end time of the time interval of the first set of time intervals.

3. The wireless device of claim 1, wherein the one or more processors are individually or collectively further operable to execute the code to cause the wireless device to:
   determine a time difference between an end time of the time interval of the first set of time intervals and a transmission time of the channel reservation signal, and wherein, to transmit the channel reservation signal, the one or more processors are individually or collectively operable to execute the code to cause the wireless device to:
   transmit an indication of the time difference in the channel reservation signal to indicate the end time of the time interval of the first set of time intervals.

4. The wireless device of claim 1, wherein, to transmit the channel reservation signal, the one or more processors are individually or collectively further operable to execute the code to cause the wireless device to:
   transmit a receiver address field of the channel reservation signal, the receiver address field indicating that the wireless device uses the first radio access technology.

5. The wireless device of claim 1, wherein the one or more processors are individually or collectively further operable to execute the code to cause the wireless device to:
   configure a network allocation vector (NAV) of the channel reservation signal to indicate an end time of the time interval of the first set of time intervals.

6. The wireless device of claim 5, wherein the one or more processors are individually or collectively further operable to execute the code to cause the wireless device to:
   identify a set of NAVs, each NAV in the set of NAVs corresponding to a time difference between transmission of the channel reservation signal and the end time of the time interval of the first set of time intervals; and
   select the NAV from the set of NAVs based at least in part on the time difference.

7. The wireless device of claim 1, wherein the first radio access technology comprises a cellular radio access technology and the second radio access technology comprises an Institute of Electrical and Electronics Engineers (IEEE) 802.11 based radio access technology.

8. The wireless device of claim 1, wherein the channel reservation signal comprises a clear-to-send (CTS) signal, or a CTS-to-self (CTS-to-Self) signal, or a downlink control information (DCI) signal, or a combination thereof.

9. The wireless device of claim 1, wherein a first duration of each time interval in the first set of time intervals is different from a second duration of each time interval in the second set of time intervals.

10. The wireless device of claim 9, wherein the first duration is based at least in part on:
    a preconfigured value;
    receiving a signaling transmission from a road side unit (RSU);
    receiving a signaling transmission from a cellular network; or
    a criteria, wherein the criteria comprises traffic conditions or a penetration rate of technologies.

11. A wireless device for wireless communication, comprising:
    one or more memories storing processor-executable code; and
    one or more processors coupled with the one or more memories and individually or collectively operable to execute the code to cause the wireless device to:
    receive a configuration signal over a first radio access technology that indicates a transmission timing scheme for a shared radio frequency spectrum band, the transmission timing scheme comprising a first set of time intervals allocated for transmissions using the first radio access technology and a second set of time intervals allocated for transmissions using a second radio access technology different from the first radio access technology, the wireless device operating according to the second radio access technology; and
    refrain from transmitting over the shared radio frequency spectrum band for an interval associated with the transmission timing scheme.

12. The wireless device of claim 11, wherein the one or more processors are individually or collectively further operable to execute the code to cause the wireless device to:
    receive, during a time interval of the first set of time intervals, a channel reservation signal over the shared radio frequency spectrum band, and wherein, to refrain from transmitting over the shared radio frequency spectrum band, the one or more processors are individually or collectively further operable to execute the code to cause the wireless device to:
refrain from transmitting over the shared radio frequency spectrum band for the interval associated with the transmission timing scheme based at least in part on a determination that the channel reservation signal is associated with the first radio access technology.

13. The wireless device of claim 11, wherein the one or more processors are individually or collectively further operable to execute the code to cause the wireless device to:
receive, during a time interval of the first set of time intervals, a channel reservation signal over the shared radio frequency spectrum band, and wherein, to refrain from transmitting over the shared radio frequency spectrum band, the one or more processors are individually or collectively further operable to execute the code to cause the wireless device to:
refrain from transmitting over the shared radio frequency spectrum band until at least an end time of the time interval of the first set of time intervals, wherein the end time of the time interval is based at least in part on the channel reservation signal.

14. The wireless device of claim 11, wherein the one or more processors are individually or collectively further operable to execute the code to cause the wireless device to:
monitor, during a second time interval of the first set of time intervals allocated for transmission using the first radio access technology, the shared radio frequency spectrum band for channel reservation signals associated with the first radio access technology; and
transmit over the shared radio frequency spectrum band during the second time interval based at least in part on identifying an absence of channel reservation signals during the second time interval of the first set of time intervals.

15. The wireless device of claim 11, wherein the one or more processors are individually or collectively further operable to execute the code to cause the wireless device to:
transmit over the shared radio frequency spectrum band during the second set of time intervals after the interval associated with the transmission timing scheme.

16. The wireless device of claim 15, wherein the interval associated with the transmission timing scheme is a time interval associated with the first set of time intervals allocated for transmissions using the first radio access technology.

17. The wireless device of claim 11, wherein the one or more processors are individually or collectively further operable to execute the code to cause the wireless device to:
receive, during a time interval of the first set of time intervals, a channel reservation signal over the shared radio frequency spectrum band; and
decode at least one of a receiver address field or a network allocation vector (NAV) of the channel reservation signal, wherein the receiver address field is identifiable as being associated with the first radio access technology and the NAV indicates an end time of the time interval of the first set of time intervals.

18. A method for wireless communications at a wireless device, comprising:
receive a configuration signal over a first radio access technology that indicates a transmission timing scheme for a shared radio frequency spectrum band, the transmission timing scheme comprising a first set of time intervals allocated for transmissions using the first radio access technology and a second set of time intervals allocated for transmissions using a second radio access technology different from the first radio access technology, the wireless device operating according to the first radio access technology;
transmitting, during a time interval of the first set of time intervals, a channel reservation signal detectable by a device operating according to the second radio access technology, the channel reservation signal indicating that the wireless device uses the first radio access technology; and
transmitting, based at least in part on the channel reservation signal, a transmission over the shared radio frequency spectrum band during at least a portion of the time interval of the first set of time intervals.

19. The method of claim 18, further comprising:
transmitting an indication of a first end time of the time interval of the first set of time intervals.

* * * * *